United States Patent
Boutaghou et al.

[11] Patent Number: 5,831,786
[45] Date of Patent: Nov. 3, 1998

[54] DISK DRIVE HAVING POSITION SENSOR FOR RAMP LOAD AND UNLOAD, AND METHOD FOR ITS USE

[75] Inventors: Zine-Eddine Boutaghou; Earl Albert Cunningham; Hal Hjalmar Ottesen, all of Rochester, Minn.

[73] Assignee: International Business Machines Corporation, Armonk, N.Y.

[21] Appl. No.: 922,115

[22] Filed: Aug. 28, 1997

Related U.S. Application Data

[60] Continuation of Ser. No. 483,040, Jun. 7, 1995, abandoned, which is a division of Ser. No. 252,667, Jun. 2, 1994, Pat. No. 5,455,723.

[51] Int. Cl.[6] ............................................. G11B 21/22
[52] U.S. Cl. ...................... 360/75; 360/105; 360/78.11
[58] Field of Search ................................. 360/105, 106, 360/75, 78.11, 77.03; 369/216, 257

[56] References Cited

U.S. PATENT DOCUMENTS

| | | | |
|---|---|---|---|
| 4,178,489 | 12/1979 | Lippel et al. | 179/100.4 C |
| 4,237,501 | 12/1980 | Barmache et al. | 360/75 |
| 4,425,534 | 1/1984 | Perahia | 310/12 |
| 4,622,516 | 11/1986 | Hearn et al. | 384/163 |
| 4,722,080 | 1/1988 | DIeckmann | 369/254 |
| 4,755,892 | 7/1988 | Carteau et al. | 360/75 |
| 4,786,994 | 11/1988 | Carteau et al. | 360/75 |
| 4,864,437 | 9/1989 | Couse et al. | 360/75 |
| 4,933,785 | 6/1990 | Morehouse et al. | 360/78.04 |
| 5,034,837 | 7/1991 | Schmitz | 360/105 |
| 5,193,080 | 3/1993 | Mohri et al. | 369/244 |
| 5,235,482 | 8/1993 | Schmitz | 360/97.02 |
| 5,241,438 | 8/1993 | Matsushima | 360/105 |

FOREIGN PATENT DOCUMENTS

| | | |
|---|---|---|
| 0545310 | 6/1993 | European Pat. Off. .......... G11B 5/54 |
| 56-165958 | 12/1981 | Japan . |
| 61-265780 | 11/1986 | Japan . |
| 3154272 | 7/1991 | Japan ............................ G11B 21/12 |
| 4349279 | 12/1992 | Japan ............................ G11B 21/12 |
| 2026208 | 1/1980 | United Kingdom . |
| 2098785 | 11/1982 | United Kingdom . |

OTHER PUBLICATIONS

Patent Abstracts of Japan, vol. 10, No. 22, P–424, Jan. 28, 1986, Toshikatsu (JP–A–60 173 783, Sep. 7, 1985).
Patent Abstracts of Japan, vol. 6, No. 145, P–132, Aug. 4, 1982, Kazuhiko (JP–A–57 064 375, Apr. 19, 1982).
IBM Technical Disclosure Bulletin, vol. 16, No. 4, Sep. 1973, p. 1182, entitled "Head Positioning By Proximity Detection of Disk Edge" by J. M. Baldwin, D. R. Foote and W. S. Seaward.
IBM Technical Disclosure Bulletin, vol. 18, No. 9, Feb. 1976, p. 3018, entitled "Magnetic Head Load/Unload Device" by S. E. Wheeler.
IBM Technical Disclosure Bulletin, vol. 22, No. 4, Sep. 1979, p. 1594, entitled "Magnetic Head Unload Mechanism" by W. P. Quinlan.
IBM Technical Disclosure Bulletin, vol. 26, No. 6, Nov. 1983, p. 2942, entitled "Capacitive Servo Detector" by K. B. Klaassen.
IBM Technical Disclosure Bulletin, vol. 29, No. 5, Oct. 1986, p. 1979, entitled "Method to Load/Unload Heads With Individual Radial Adjust Capability" by T. R. Fournier and L. J. Schmidt.

*Primary Examiner*—Andrew L. Sniezek
*Attorney, Agent, or Firm*—Richard E. Billion; Matthew J. Bussan

[57] ABSTRACT

Disclosed is a disk drive having at least one disk for storing data. The disk drive includes at least one transducer for reading or writing data to or from the disk. The transducer is attached to an actuator which positions the transducer with respect to the disk. The actuator includes a controllable motor which is used to move the actuator and the transducer attached thereto. The disk drive also includes a ramp for off loading the transducer or for parking the transducer off of the surface of the disk. Also disclosed is apparatus and methods for measuring and controlling the movement of the actuator and attached transducer while the transducer is coming from a position off of the ramp and onto the surface of the disk.

10 Claims, 17 Drawing Sheets

DISK DRIVE HAVING POSITION SENSOR FOR RAMP LOAD AND UNLOAD, AND METHOD FOR ITS USE

This application is a continuation of application Ser. No. 08/483,040, filed Jun. 7, 1995 now abandoned which is a divisional of application Ser. No. 08/252,667 filed on Jun. 2, 1994, now U.S. Pat. No. 5,455,723.

FIELD OF THE INVENTION

The present invention pertains to the field of disk drives which are also called direct access storage devices (DASD).

More particularly, this invention pertains to a ramp used to load and unload a transducing head onto and off of a disk, and for a method of controlling the movement of the transducing head as it passes over the ramp.

BACKGROUND OF THE INVENTION

One of the key components of a computer system is a place to store data. Typically computer systems employ a number of storage means to store data for use by a typical computer system. One of the places where a computer can store data is in a disk drive which is also called a direct access storage device.

A disk drive or direct access storage device includes several disks which look similar to 45 rpm records used on a record player or compact disks which are used in a CD player. The disks are stacked on a spindle, much like several 45 rpm records awaiting to be played. In a disk drive, however, the disks are mounted to spindle and spaced apart so that the separate disks do not touch each other.

The surface of each disk is uniform in appearance. However, in actuality, each of the surfaces is divided into portions where data is stored. There are a number of tracks situated in concentric circles like rings on a tree. Compact disks have tracks as do the disks in a disk drive. The tracks in either the disk drive or the compact disk essentially replace the grooves in a 45 rpm record. Each track in a disk drive is further subdivided into a number of sectors which is essentially just one piece of the track.

Disks in a disk drive are made of a variety of materials. Most commonly, the disks used in rotating magnetic systems is made of a substrate of metal, ceramic, glass or plastic with a very thin magnetizable layer on either side of the substrate. Such a disk is used in magnetic, and magneto-optical storage. Storage of data on a such a disk entails magnetizing portions of the disk in a pattern which represents the data. Other disks, such as those used in CD's, are plastic. Data, such as songs, is stored using a laser to place pits in the media. A laser is used to read the data from the disk.

As mentioned above, to store data on a disk used in a rotating magnetic system, the disk is magnetized. In order to magnetize the surface of a disk, a small ceramic block known as a slider which contains at least one magnetic transducer known as a read/write head is passed over the surface of the disk. Some ceramic blocks contain a separate read head and a separate write head. The separate read head can be a magnetoresistive head which is also known as an MR head. The ceramic block is flown at a height of approximately six millionths of an inch or less from the surface of the disk and is flown over the track as the transducing head is energized to various states causing the track below to be magnetized to represent the data to be stored. Some systems now also use near contact recording where the slider essentially rides on a layer of liquid lubricant which is on the surface of the disk. With near contact recording, the ceramic block passes even closer to the disk.

To retrieve data stored on a magnetic disk, the ceramic block or slider containing the transducing head is passed over the disk. The magnetized portions of the disk generate a signal in the transducer or read head. By looking at output from the transducer or read head, the data can be reconstructed and then used by the computer system.

Like a record, both sides of a disk are generally used to store data or other information necessary for the operation of the disk drive. Since the disks are held in a stack and are spaced apart from one another, both the top and the bottom surface of each disk in the stack of disks has its own slider and transducing head. This arrangement is comparable to having a stereo that could be ready to play both sides of a record at anytime. Each side would have a stylus which played the particular side of the record.

Disk drives also have something that compares to the tone arm of a stereo record player. The tone arm of a disk drive, termed an actuator arm, holds all the sliders and their associated transducing heads, one head for each surface of each disk supported in a structure that looks like a comb at one end. The structure is also commonly called an E block. A portion of metal, known as a suspension, connects the sliders to the E block. At the other end of the actuator is a coil which makes up a portion of an voice coil motor used to move the actuator. The entire assembly is commonly referred to as an actuator assembly.

Like a tone arm, the actuator arms rotate so that the transducers within the sliders, which are attached to the actuator arm can be moved to locations over various tracks on the disk. In this way, the transducing heads can be used to magnetize the surface of the disk in a pattern representing the data at one of several track locations or used to detect the magnetized pattern on one of the tracks of a disk. Actuators such as the ones described above are common to any type of disk drive whether its magnetic, magneto-optical or optical.

One of the most critical times during the operation of a disk drive is just before the disk drive shuts down. When shutting down a disk drive, several steps are taken to help insure that the data on the disk is preserved. In general, the actuator assembly is moved so that the transducers do not land on the portion of the disk that contains data. How this is actually accomplished depends on the design of the drive. The disk drive design of interest for this invention includes a ramp. Disk drives with ramps are well known in the art. U.S. Pat. No. 4,933,785 issued to Morehouse et al. is one such design. Other disk drive designs having ramps therein are shown in U.S. Pat. No. 5,235,482 and U.S. Pat. No. 5,034,837.

Typically, most of the ramp is situated off to the side of the disk. A portion of the ramp is positioned over the disk itself. In operation, before power is actually shut off, the actuator assembly swings the suspension or another portion of the actuator assembly up the ramp to a park position at the top of the ramp. This is much like a child running up a playground slide backwards and sitting at the top of the slide. When the actuator assembly is moved to a position where parts of the assembly are at the top of the ramp, the sliders or ceramic blocks, which include the transducers, are positioned so that they do not contact the disk. Commonly, this procedure is known as unloading the heads. Unloading the heads helps to insure that data on the disk is preserved since, at times, unwanted contact between the slider and the disk results in data loss on the disk.

Startup of a disk drive with a ramp is an even more critical time. Startup includes moving the actuator assembly so that the suspension slides down the ramp and so that the slider flies when it gets to the bottom of the ramp. This is much like a water slide where the bottom of the pool is the disk and the slide is the ramp. When the rider gets to the bottom, he "flies" by skimming across the water rather than touching the bottom of the pool. In other words, the best ramp control designs prevent contact between the slider and the disk so as to prevent any type of data loss.

The most common mechanical design which assures that the slider will fly requires a ramp with a very gentle slope. There are problems associated with this design. Most importantly, a gentle sloping ramp is longer than a short ramp and requires more space. Space is becoming more precious as the form factor of the disk drive shrinks. Currently, the smallest disk drive on the market has a disk with a diameter of 1.3". Also on the market are PCMCIA form factor disk drives. The PCMCIA disk drives have the length and width of a credit card. The height of these drives varies. The disk in such a drive has a diameter of about 1.8". Packing a long ramp in such a small packages is difficult. Even if it can be done, there will be a push toward steeper ramps since with a steeper sloping ramp, more of the disk surface can be devoted to storing data to satisfy the consumer's thirst for increased data capacity.

A way to accommodate a steeper ramp is to control the velocity of the slider as it moves down the ramp. If the velocity can be controlled, the downward portion of the speed can be controlled so that the slider will not result in the slider hitting the disk. U.S. Pat. No. 4,864,437 issued to Couse et al. teaches one way of controlling the velocity of the slider as it moves down a ramp. In Couse et al., the voltage across a voice coil motor is monitored and controlled. The voltage across the voice coil motor includes a small component of the total voltage known as Back EMF. A voice coil motor includes magnets and an actuator coil. When the actuator coil cuts a magnetic field, Back EMF is generated. The Back EMF varies as a function of the velocity of the actuator coil through the magnetic field produced by the magnets of the voice coil motor and, presumably, as a function of the velocity of the actuator down the ramp. Thus, it is possible to get an estimate of the rotational velocity of the actuator from the Back EMF of the actuator motor. From the rotational velocity estimate and knowing the designed slope of the ramp one can calculate the component of velocity in the vertical direction (perpendicular to the surface of the disk). It is important to carefully control the vertical velocity in order to prevent any damage to the disk surface.

The design of the velocity control in Couse et al. also has problems. Most importantly, the Back EMF is a very small component of the total voltage across the coil of the actuator. This component will also become smaller as additional current is passed through the coil. The Back EMF signal is also prone to noise. In short, since the Back EMF component of the voltage across the actuator is small and prone to noise, it does not always reliably reflect the actual velocity of the slider. In addition, as the operating temperature of the disk drive increases, the noise level increases making the Back EMF an even smaller component and even more prone to noise. If there happens to be an error indicating that the velocity is slower than it actually is, then an increase in the actuator coil current may cause the velocity of the slider down the ramp to increase to the point where the slider will contact the surface of the disk. This could cause a head crash resulting in a loss of data. It should be remembered that contact between the disk and the slider might not instantly cause data loss. Many times it causes particle generation within the disk enclosure. Generated particles, although seemingly small in everyday terms, are "boulders" to a slider that is flying at less than six millionths of an inch from the surface of the disk.

Another problem is that at the smaller form factors the torque constant of the actuator moves down drastically which means that the actuator motor can not get the slider moving as quickly in a smaller form factor drive. For example, the torque constant in the current 1.8" PCMCIA type drives is approximately 10–15% of the torque constant in a 2.5" drive (the next larger form factor). In essence, smaller form factor drives must use smaller actuator motors which produce less torque. This problem also gets worse as the height dimension of the drive shrinks since a smaller actuator motor is used. Thus, as the actuator motors get smaller there is less torque to get the actuator moving and therefore less Back EMF signal produced over the short amount of stroke for the sliders to move down the ramp. The result is that the noise further drowns out the smaller Back EMF signal produced by the slower moving actuator.

Yet another problem with using the Back EMF of the actuator motor to determine speed is that the Back EMF varies with the temperature of the permanent magnets and the coil resistance in the voice coil motor. In small form factor drives that may go into a laptop or sub-laptop computer there may be instances where the drive may park the sliders on the ramp and, within minutes, slide them back down the ramp again. In these applications, the disk drive will be at or near the operating temperature of the drives. The operating temperature of a drive can be up to 50 degrees Celsius higher than the drive when it first starts from room temperature. The Back EMF can vary as much as 10–15% over such a temperature range. Of course this amount of difference in the Back EMF signal translates into a 10–15% difference in the vertical component of velocity of the transducer which may well result in the head contacting the disk.

Of course, the system can be designed to accommodate "worst case" situations but this results in a sub-optimal design. In addition, the prior art teaches no way of estimating what the initial values of several data points might be so that the velocity function can be accurately estimated while the transducer is on the ramp.

Although the measure of Back EMF is a closed loop process in terms of velocity control, the use of Back EMF does not indicate position. There is a problem, potentially, in not knowing the position of the transducer as it moves over the ramp.

Thus, what is needed is a device that can accurately and repeatably determine the velocity of the slider as it moves down the ramp without regard to temperature fluctuations, differing noise levels, or changes in the temperature of the actuator motor. In addition, what is needed is a device that allows an estimate of the velocity to be made from a constant generated while the transducer is still parked on the ramp making a single measurement. Preferably, the velocity of the slider will not be determined based on the Back EMF of the actuator coil of the actuator assembly.

SUMMARY OF THE INVENTION

The invention is an apparatus and method for estimating the position of the head or transducer as it moves up or down the ramp. A reliable velocity estimation is also made. The Back EMF of the coil is not used which eliminates the problems associated with noise and the fact that as the coils get smaller and smaller the Back EMF component also gets smaller.

In one set of preferred embodiments, one part of a two part sensor is attached to the actuator and another part to the housing of the disk drive storage device. The output of the sensor indicates the particular distance along the surface of the ramp. The sensor in this preferred embodiment is a Hall effect sensor and a button magnet. The output voltage of a Hall effect sensor varies in response to temperature. Disclosed is a method for making an initial measure while the transducer is atop the ramp and using it to estimate the output voltage for the various positions of transducer. A method of exactly calibrating the velocity estimation using the track spacing on the disk as a gauge is also disclosed.

Another preferred embodiment in the first set uses a capacitance probe. In each of these embodiments, the servo electronics have two parts. One part is for servoing while the transducer is positioned over the disk. Another servo electronics part is for servoing while the transducer is positioned over the surface of the ramp. In each case a controller is used to switch between the servo electronic parts.

Another set of preferred embodiments does not use a separate two part sensor. Rather, the recording transducer is used and a portion of the ramp is either magnetized or produces a magnetic field. The same servo electronics can be used while the transducer is passing over the ramp and while the transducer is passing over the disk.

All of the preferred embodiments are used ultimately to control the movement of the actuator which controls the velocity of the transducer up or down the ramp.

Advantageously, in each of these embodiments, the velocity of the transducer as it travels down the ramp can be determined without concern regarding the noise level in the coil of a motor driving the actuator or regarding the size of the coil of the motor. In addition, the temperature of the disk drive will have either no effect or the effect can be corrected.

BRIEF DESCRIPTION OF THE DRAWINGS

For a better understanding of the present invention, reference can be made to the accompanying drawings, in which.

These drawings are not intended as a definition of the invention but are provided solely for the purpose of illustrating the preferred embodiments of the invention described below.

DETAILED DESCRIPTION OF THE PREFERRED EMBODIMENT

Figure 1:
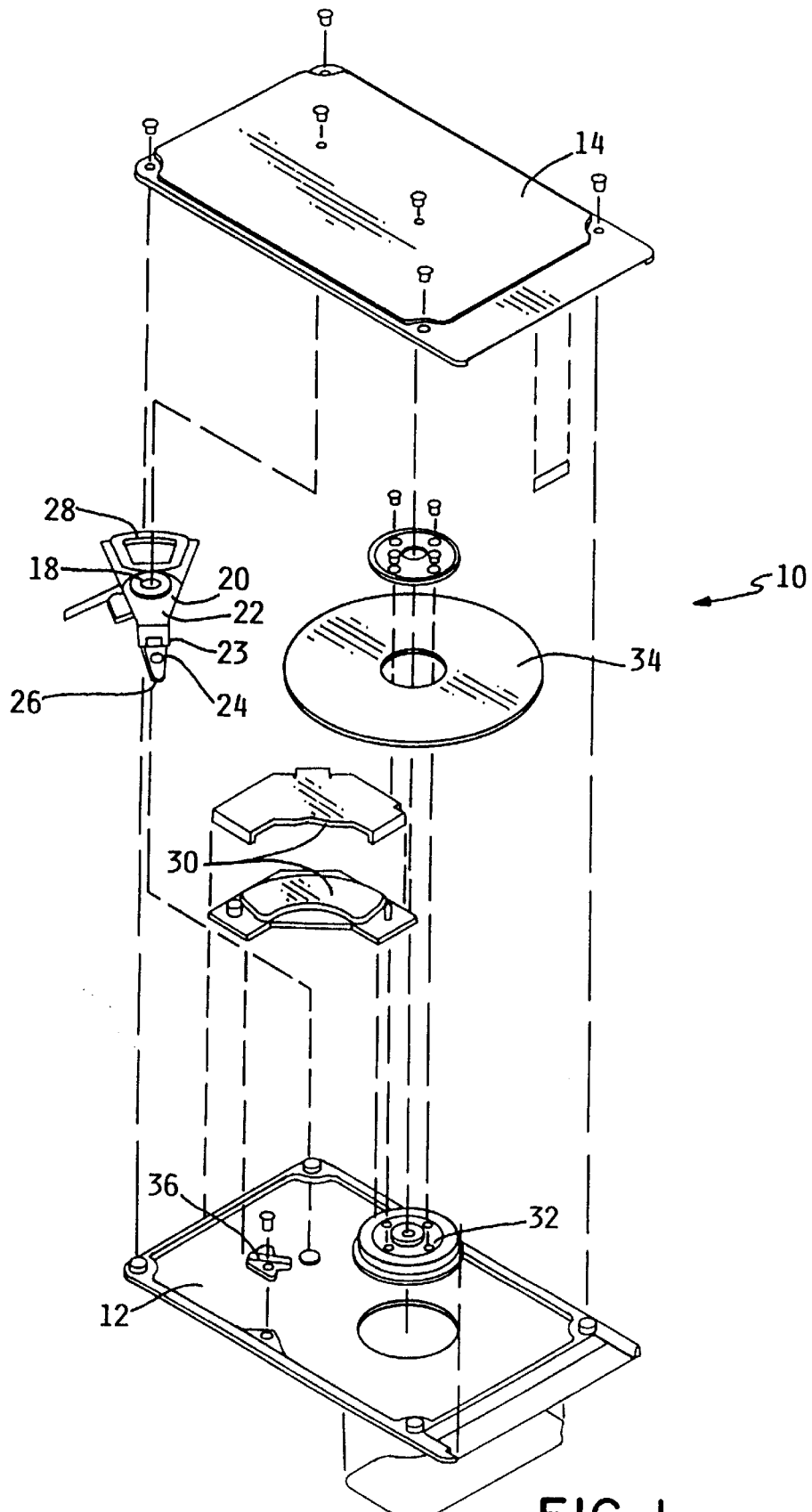
FIG. 1 is an exploded view of a disk drive.

The invention described in this application is useful with all mechanical configurations of disk drives or direct access storage devices ("DASD") having either rotary or linear actuation. FIG. 1 is an exploded view of a disk drive 10 having a rotary actuator. The disk drive 10 includes a housing 12, and a housing cover 14. The housing 12 and housing cover 14 form a disk enclosure. Rotatably attached to the housing 12 on an actuator shaft 18 is an actuator assembly 20. The actuator assembly 20 includes a comb-like structure 22 having a plurality of arms 23. Attached to the separate arms 23 on the comb 22, are load beams or load springs 24. Attached at the end of each load spring 24 is a slider 26 which carries a magnetic transducer 50 (shown in FIG. 3). The slider 26 with the transducer 50 form what is many times called the head. It should be noted that many sliders have one transducer 50 and that is what is shown in the Figures. It should also be noted that this invention is equally applicable to sliders having more than one transducer, such as what is referred to as an MR or magneto resistive head in which one transducer 50 is generally used for reading and another is generally used for writing. On the end of the actuator arm assembly 20 opposite the load springs 24 and the sliders 26 is a voice coil 28.

Attached within the housing 12 is a pair of magnets 30. The pair of magnets 30 and the voice coil 28 are key parts of a voice coil motor which applies a force to the actuator assembly 20 to rotate it about the actuator shaft 18. Also mounted to the housing 12 is a spindle motor 32. The spindle motor 32 includes a rotating portion called the spindle hub 33. In FIG. 1, a single disk 34 is attached to the spindle hub 33. In other disk drives a number of disks may be attached to the hub. The invention described herein is equally applicable to disk drives have a number of disks attached to the hub of the spindle motor.

Figure 2:
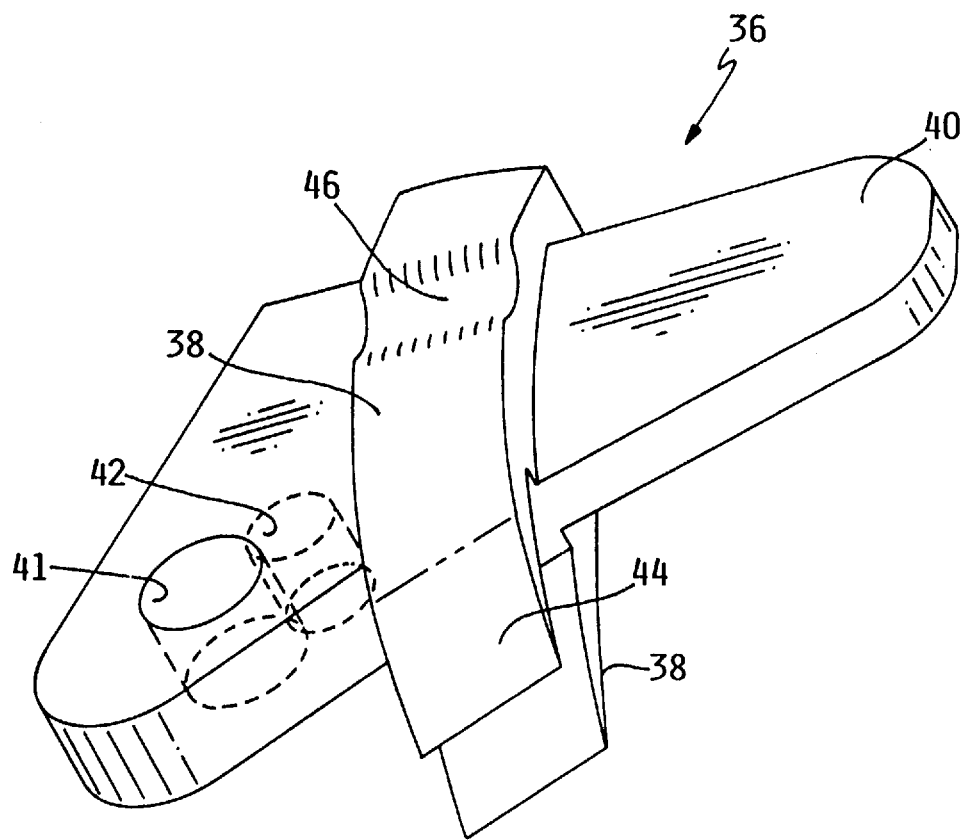
FIG. 2 is a isometric view of a ramp from a disk drive.

Also attached to the housing 12 is a ramp structure 36. Now looking at both FIGS. 1 and 2, the ramp structure has two ramp portions 38. One of the ramp portions 38 is for the loading and unloading the transducer from the bottom surface of the disk and the other ramp portion is for loading and unloading a transducer from the top surface of the disk. The ramp structure 36 shown in FIG. 2 is fixed and a portion of each of the ramp portions 38 of the ramp is positioned over the disk 34. It should be noted that this invention could also be used on ramps that rotate in and out of a load/unload position.

FIG. 2 is an isometric view detailing the ramp structure 36. The ramp structure 36 includes the ramp portion 38 and the ramp support structure 40. The support structure 40 has a first opening 41 and a second opening 42 therein which facilitate mounting the ramp 36 to a pair of corresponding pegs on the housing 12. The ramp structure 36 includes an inclined surface 44 and a parking detent 46. A portion of the ramp structure 36 or the support structure 40 over which the transducer (shown in FIG. 3) passes may also be made readable by the transducer. For example, in one of the preferred embodiments described in detail below a piece of magnetized tape is applied to the side of the ramp portion 38 nearest the transducer. In another embodiment, the ramp portion 38 could be sputtered or otherwise coated with a magnetic layer. This sputtered ramp portion could then be magnetized. In either of these embodiments, the ramp portion nearest the transducer would then be able to read the ramp portion during loading or unloading of the actuator and positional information and velocity information could be determined directly from the ramp itself.

Figure 3:
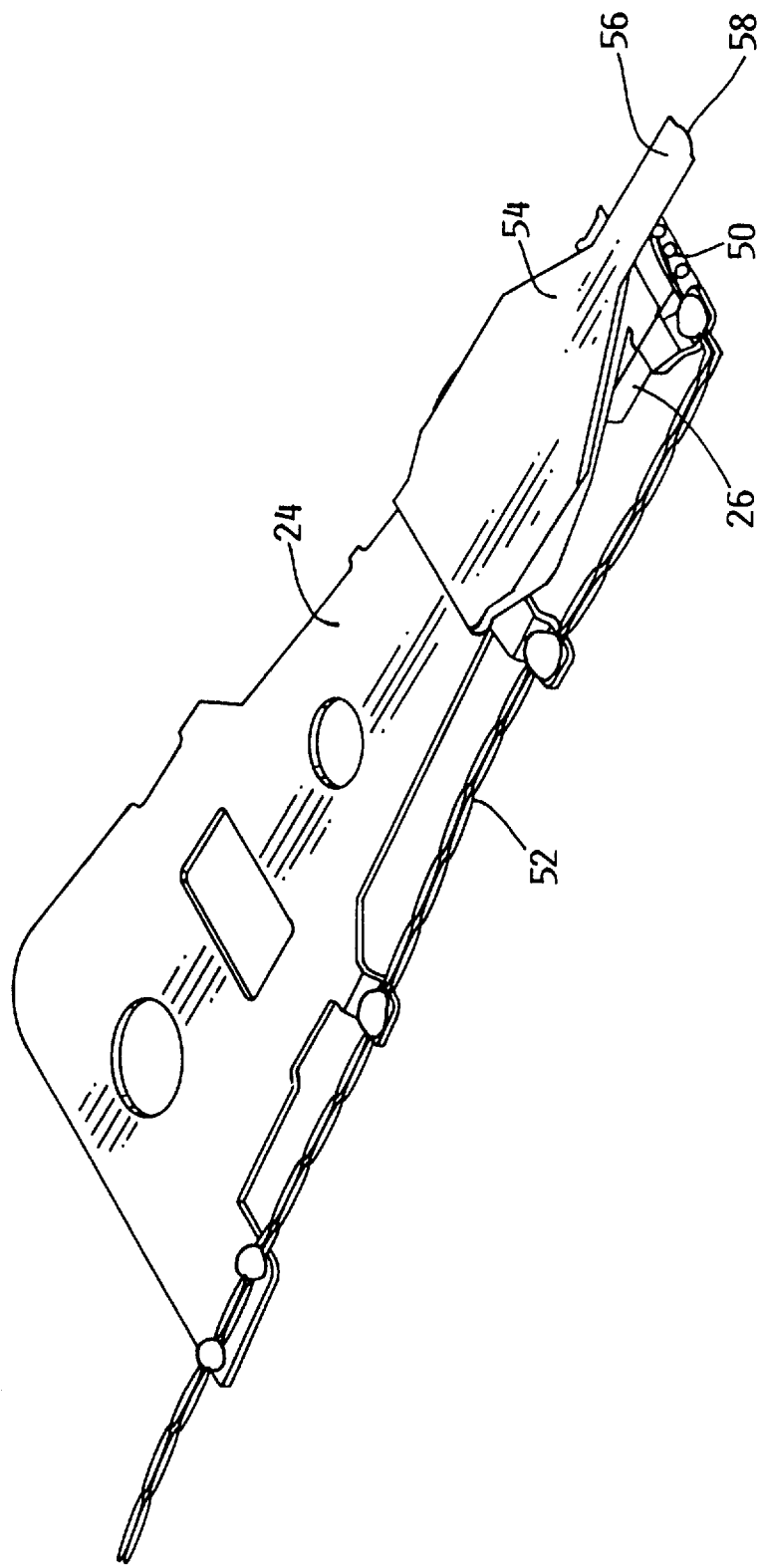
FIG. 3 is a isometric view of a load beam from a disk drive.

FIG. 3 details the load beam 24 and a slider 26 attached to the end of the load beam 24. The slider 26 includes at least one transducer 50. Signal carrying wires 52 are attached to each transducer 50 in the slider 26 and are routed along the edge of the load beam 24. Also attached to the load beam 24 is ramp riding member 54. The ramp rider 54 includes an extension 56 which actually contacts the surface of the ramp portion 38 of the ramp structure. The extension 56 of the ramp rider 54 includes a curved portion which fits within the parking detent 46 of the ramp portion 38 (shown in FIG. 2).

Figure 4:
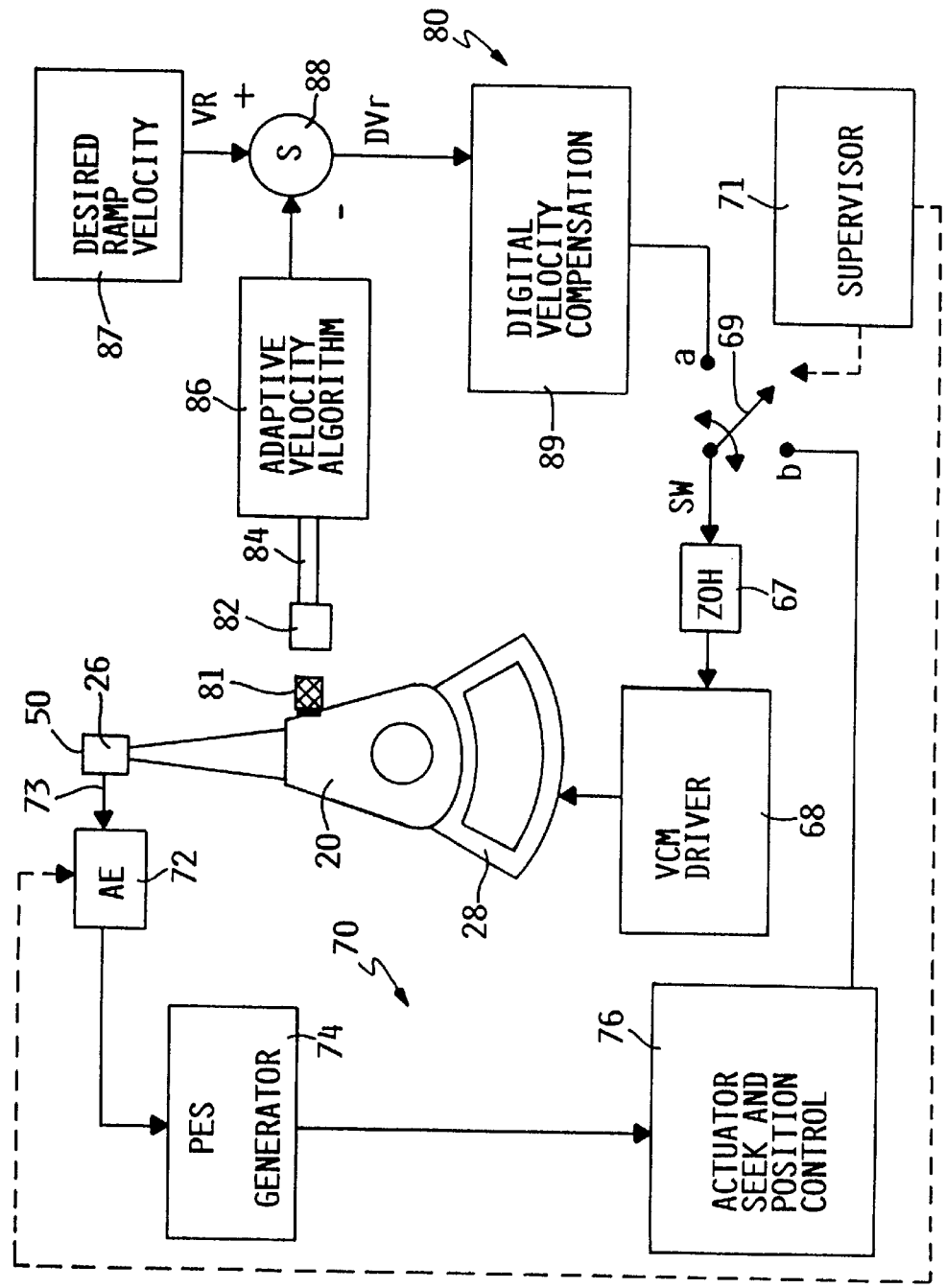
FIG. 4 is an schematic view of one preferred embodiment of the inventive velocity controller.

Now turning to FIG. 4, the first of the preferred embodiments will be shown and described. FIG. 4 shows an actuator assembly 20 similar to the one shown in FIG. 1. The actuator assembly 20 shown in FIG. 4 includes the slider 26 and the transducing head 50 at one end and the voice coil 28 at the other end. Also shown in FIG. 4 is a servo system which can be thought of as having two sets of electronics— one for servoing on the disk surface 70 which is on the left half of FIG. 4 and one for servoing across the ramp structure 80 which is on the right half of FIG. 4. Common elements of both servo systems are a ZOH (Zero Order Hold) device 67 and a voice coil motor driver 68. The ZOH device outputs a certain level of signal until the next input is fed to the device, like a digital to analog converter with hold capability. In other words, the output of the ZOH device 67 is a staircase function.

The ZOH device 67 takes the signal from one of the servo systems and outputs a desired amount of current to the voice coil motor 28 until the next signal is input to the ZOH device 67. The voice coil motor in turn, controls the transducer while in transducing relation with the disk 34 and controls the slider and transducer as it is going up (unloading the heads) or down (loading the heads) the ramp portion 38 of the ramp structure 36. A switch 69 under control of a supervisor 71 switches between the disk servoing electronics 70 and a ramp servoing electronics 80. The supervisor 71 is a portion of a microcontroller, such as a part number TM5320M25 available from Texas Instruments.

Now looking more closely at the electronics schematically shown in FIG. 4, the disk servo electronics 70 include an arm electronics module 72, a position error signal generator 74 and an actuator seek and position controller 76. The disk servo electronics are well known in the art of disk drives and, therefore, the discussion of their description and operation will be abbreviated. In operation, the signal from the read portion of the transducer 50 travels across the signal carrying wires 52 (shown in FIG. 3). The line 73 of FIG. 4 depicts the signal carrying wires between the transducer 50 to the arm electronics module 72. The arm electronics essentially cleans up and amplifies the signal. The signal from the aim electronics module 72 is output to the position error signal generator which compares the positions as read to the desired positions and outputs a position error signal to the actuator seek and position controller 76. In the actuator seek and position controller 76, velocities are calculated or estimated and compared to the desired velocities. The actuator seek and position controller 76 is actually a multipurpose microprocessor so the velocities are calculated along with other calculations. The actuator seek and position controller 76 outputs a signal to control the actuator so that it will more closely match the desired position or velocity at the next sample time. The disk servo electronics 70 will only be used when the transducer 50 is over the disk 34 so during this time the switch 69 will be in the "b" position as shown in FIG. 4.

The ramp servo electronics 80 include a small button magnet 81 attached to the actuator assembly 20, a Hall effect sensor 82 fixedly attached to the housing 12 near the small button magnet 81, an adaptive velocity linearizer 86, a source of desired ramp velocity 87, a summing junction 88 and a digital velocity compensator 89.

In operation, the distance between the small button magnet 81 and the Hall effect sensor 82 will increase when the transducer 50 is being loaded on the disk 34 as it travels down the ramp portion 38. When unloading the transducer, the distance between the small button magnet 81 and the Hall effect sensor 82 will decrease as the transducer travels up the ramp portion 38. The relationship just described describes a drive where the Hall effect sensor is mounted on the outermost edge of the disk 34. This relationship would change if the Hall effect sensor was mounted elsewhere. Most importantly, as the distance between the Hall effect sensor 82 and the small button magnet 81 varies, the output from the Hall effect sensor 82, depicted by lines 84, varies as an inverse like function of the distance.

Thus, the output from the Hall effect sensor 82 gives positional information. Given certain sampling times, this discrete positional information can be converted to velocity information. The adaptive velocity linearizer 86 converts the analog signal from the Hall effect sensor 82 to a series of digital outputs. The adaptive velocity linearizer 86 also converts the nonlinear output from the Hall effect sensor to a linear function. The output of the adaptive velocity linearizer, which is the actual measured ramp velocity, is compared to the desired ramp velocity at the summing junction/adder/comparator 88. The difference between the desired ramp velocity and the actual ramp velocity is the output of the summing junction/adder/comparator 88. The output of the summing junction 88 is input to the digital velocity compensator 89 which produces a control signal so the actuator will more closely match the desired ramp velocity. The ramp servo electronics 80 will only be used when the transducer 50 is over the ramp portion 38, so during this time the switch 69 will be in the "a" position as shown in FIG. 4.

Figure 5:
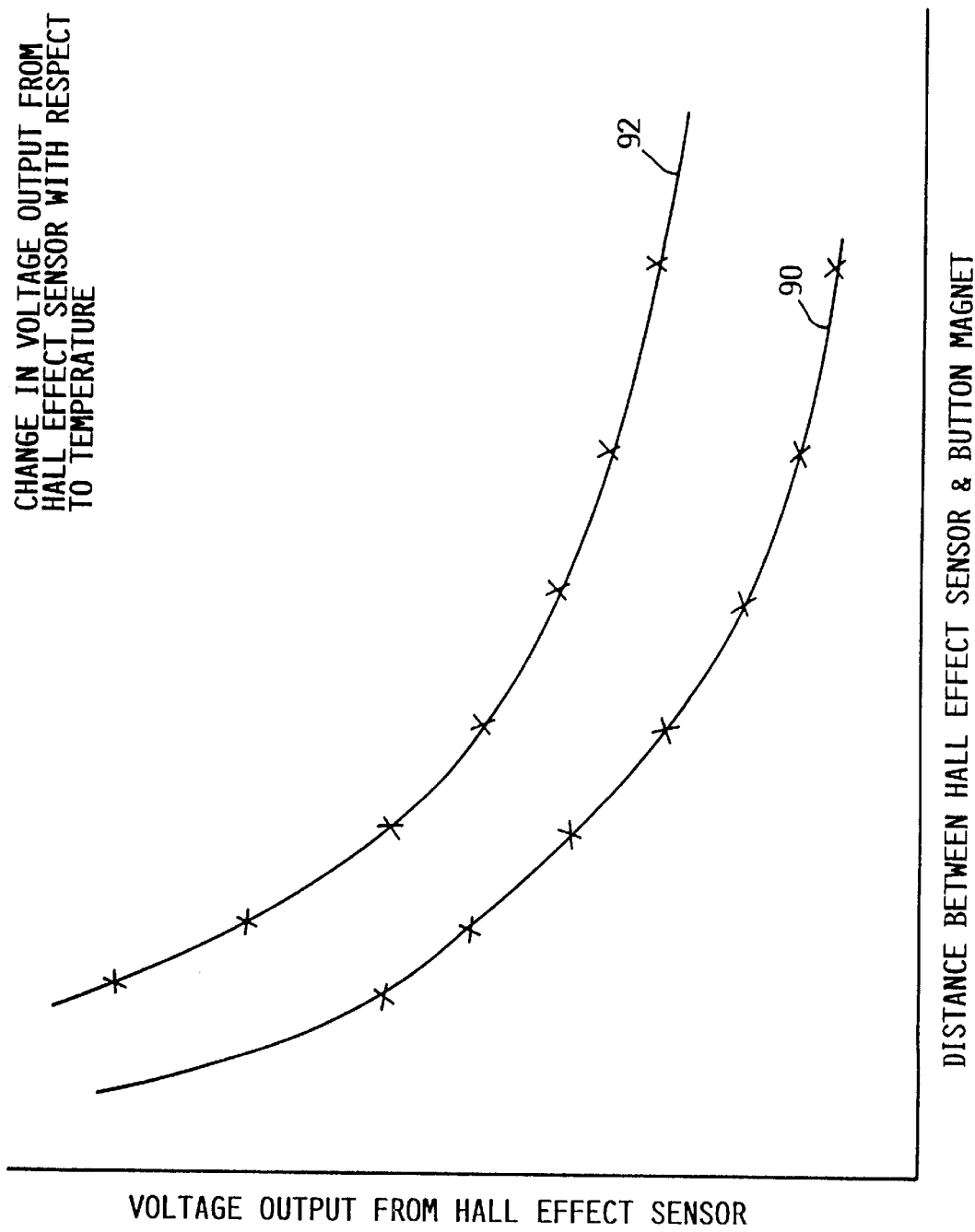
FIG. 5 is a graph showing how the curve of voltage vs. distance from a Hall effect sensor changes with respect to temperature.

FIG. 5 shows how the output voltage from the Hall effect sensor 82 varies with respect to the distance x between the Hall effect sensor 82 and the magnet 81 attached to the actuator assembly 20. Two curves are also shown in FIG. 5. Curve 90 is at a first temperature and curve 92 is at a second temperature. FIG. 5 shows that the output voltage also varies with temperature and also shows graphically that the shape of the curve does not change drastically in the presence of a temperature change. The curve merely shifts in response to a temperature change. The shift occurs mainly because the change in temperature changes the strength of the magnetic field. Thus for a given value of x the value of the output of the Hall effect sensor changes in the presence of a temperature change. Also worthy of note is that the slope at the point corresponding to the given value x or the differential on the first curve y=f(x) differs from the slope at the point on the second curve y=f(x) for the same given value of x. This is due to the fact that when the entire curve essentially shifts as a result of the temperature change, value of x remains the same so that the point slope taken at a point y for a given value of x is essentially taken at a different point on the shifted curve. The importance of this will be pointed out in the following paragraphs.

Speaking generally, in order to have an effective method to determine the velocity of the transducer and slider as it moves up or down the ramp, one must have an accurate measure or an accurate estimate of the location of the slider or transducer on the ramp at a given time. If an accurate measure or estimate of the position can be made at two sample times, then the velocity can be determined simply by subtracting the first position from the second position to determine the distance traveled and dividing by the difference in the sample time.

Since the voltage output of the Hall effect sensor (y=f(x) on either the first curve 90 or the second curve 92 varies as a function of temperature, it is difficult to correlate the output of the Hall effect sensor to actual positions on the ramp without additional information or without making an assumption. One way to estimate the initial positions of the actuator arm with respect to the ramp is to make an assumption about the position of the curve of the output of the Hall effect sensor y(x). One could assume a set of initial startup conditions which would include the typical temperature at which the drive will start up. The output of the Hall effect sensor at several known positions would be measured shortly after a typical startup under a set of "typical" conditions. The values would then be stored in a nonvolatile memory space. This will work as long as the startup conditions remain constant each time the disk drive is started. Problems occur when he startup conditions do not match the "typical" conditions assumed. When this occurs then the output of the Hall effect sensor 82 will not correlate to a specific distance between the small button magnet 81 and the Hall effect sensor 82.

Another method for correlating the location of the curve of voltage output from the Hall effect sensor y(x) verses the distance between the small button magnet 81 and the Hall effect sensor 82 has been developed. The method, in very simplistic terms, is to make an estimate of the point slope at y=f(x) for a known value of x. Since the point slope varies depending on where the curve has shifted to for a given known value of x, a person can accurately estimate the position of the curve y=f(x) if the point slope is known. Once the shifted position of the curve y=f(x) is known, the output of the Hall effect sensor 82 can be correlated so that the distance between the Hall effect sensor 82 and the small button magnet 81 can be accurately estimated. The known value of x that is used, $x_0$, is the location of Hall sensor 82 with respect to the small button magnet 81 while the actuator has the slider with the transducer therein parked on the ramp structure 36.

Figure 6:
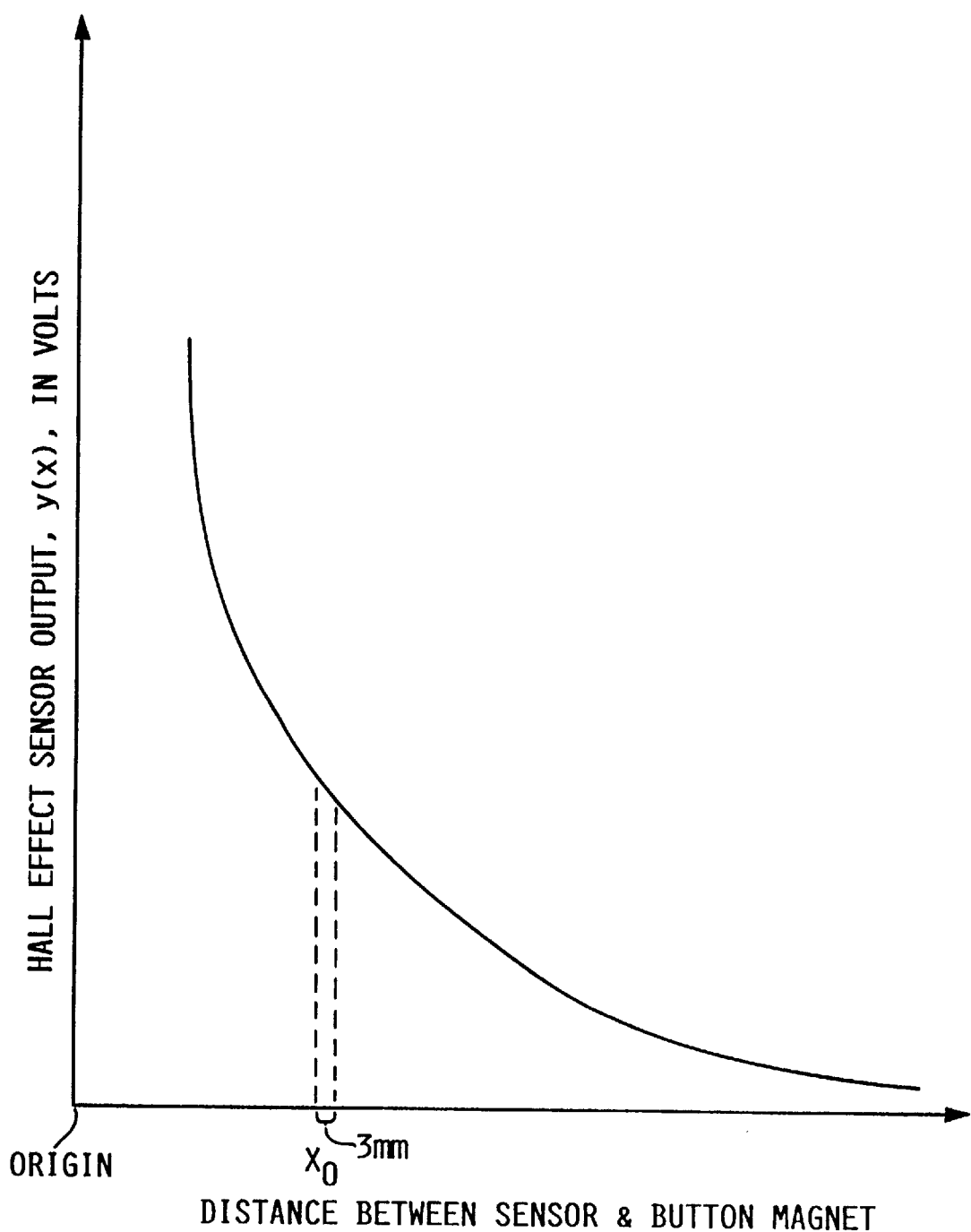
FIG. 6 is a graph illustrating that, due to the short stroke of the voice coil motor, only a small portion of the curve of voltage vs. distance from a Hall effect sensor is used in detecting distances in between the actuator and the small button magnet.
Figure 7:
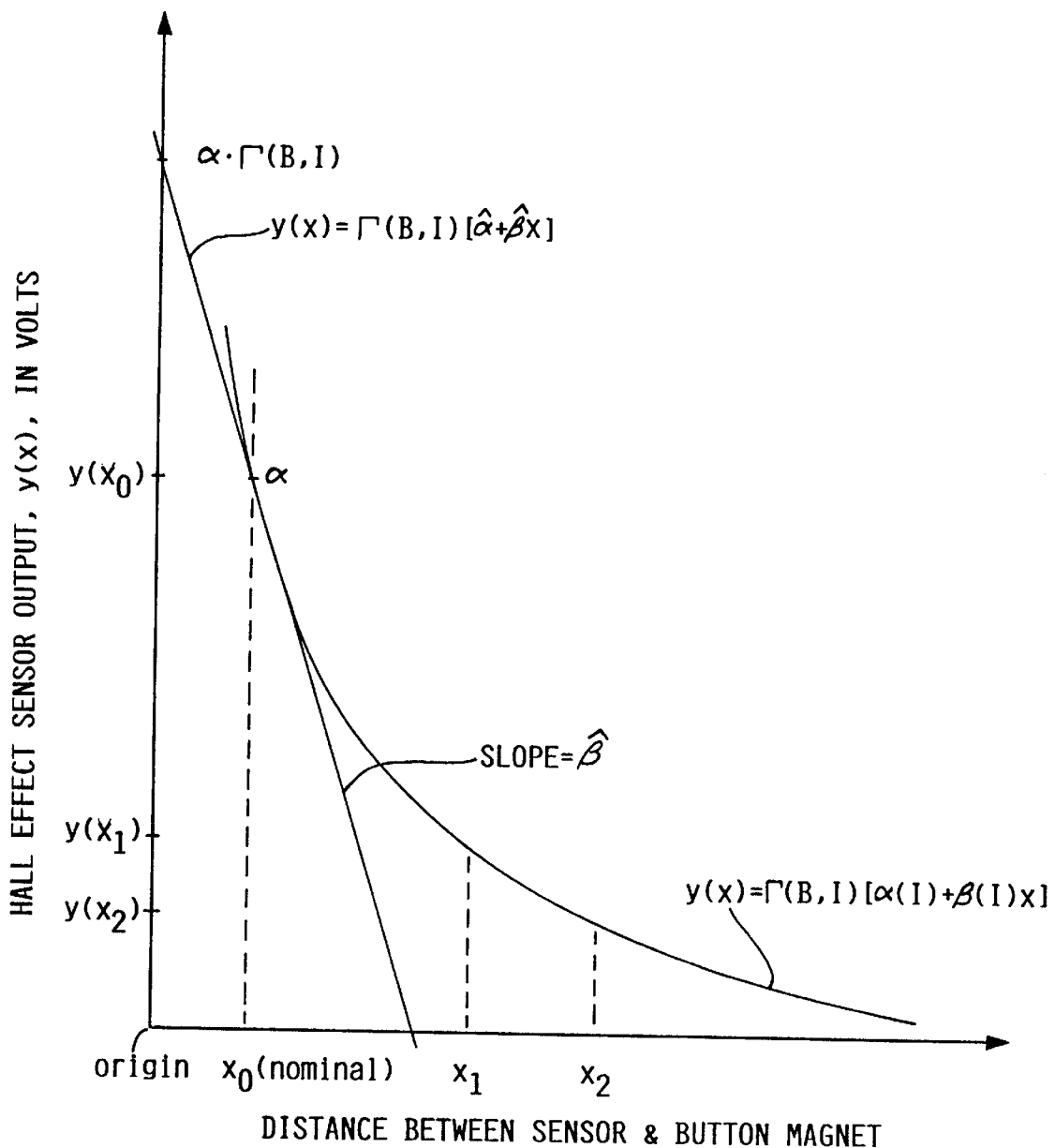
FIG. 7 is a graph showing how the curve of voltage vs. distance from a Hall effect sensor changes with respect to distance.

Now turning to FIGS. 6 and 7, we will begin discussing the method and means for estimating the location of the curve y=f(x)=the output of the Hall effect sensor vs. the distance between the small button magnet 81 and the Hall effect sensor 82. FIG. 6 shows one curve y which is the output of the Hall effect sensor 82 as a function of increasing distance from the small button magnet 81. This curve y shown in FIG. 6 corresponds to any one of a number of curves that occur at a particular temperature and include the curves 92 or 90 shown in FIG. 5. FIG. 6 shows a value $X_0$ which is the distance between the button magnet 81 and the Hall effect sensor 82 when the transducer is parked on the ramp structure 36. FIG. 6 illustrates that the distance x between the Hall effect sensor 82 and the button magnet 81 is very short compared to the total distance x over which the curve y operates. Therefore, only a relatively small portion of the curve y is used in a disk drive due to the short stroke of the actuator assembly 20 (shown in FIG. 1). As a result, one could reasonably assume that the function y=f(x) is piecewise linear since the distance x due to the stroke of the actuator assembly is small compared to the total distance x over which the curve y=f(x) operates. In a 1.8" disk drive, the total length of travel between the button magnet 81 and the Hall effect sensor 82 is approximately 3 millimeters. In a 3.5" drive the total distance between $x_0$ and x max is about the same. Since the distance over which x varies covers a very small portion of the curve y=f(x), one can make the assumption that the function y=f(x) is essentially piecewise linear in the affected region. Therefore, making this assumption, provides a logical starting point—namely that y(x) can be stated as a linear equation, which is as follows:

$$y(x) = \Gamma(B,I)[\alpha(I) + \beta(I)x] \qquad \text{EQ 1}$$

where, $\Gamma(B,I)$=an unknown nonlinear gain constant;

B=the magnetic field strength

I=the Hall effect sensor current $\alpha(I)$=a non-linear function of the current I $\beta(I)$=a non-linear function of the current I Now having assumed that the equation is linear, this can be written $$y(x) = \Gamma(B,I)[\alpha(I)] + \Gamma(B,I)\beta(I)x \qquad \text{EQ 2}$$

From simple algebra, the slope term in an equation of the form y=mx+b is m. Thus, in Equation 2 the slope of the line is:

$$\text{Slope} = \Gamma(B,I)\beta(I) \qquad \text{EQ 3}$$

A robust estimate of the slope is defined as $\hat{\beta}$ (beta hat)

$$\hat{\beta} = \Gamma(B,I)\beta(I) = \frac{y(x_2) - y(x_1)}{x_2 - x_1} \qquad \text{EQ 4}$$

where $y(x_1)$ is the average Hall effect voltage per integral revolution measured when the actuator is track following on cylinder C, and $x_1$ is the separation between the button magnet and the Hall device. Similarly, at a given cylinder C2, $y(x_2)$ at distance $x_2$ is measured. Note that due to the high precision used for servo writing, the difference $x_2-x_1$ is known with a high degree of accuracy. It is this accuracy that gives us such a superior estimation of the slope.

Now returning to Equation 1, an estimate $\hat{\alpha}$ (alpha hat) and a ratio $\eta$ will be derived. First, solve equation (1) for $\alpha(I)\Gamma(B,I)$ as shown in Equation (5) below and let $x=x_0=x_0$ (nom)

$$\alpha(I)\Gamma(B,I) = y(x_0) - \beta(I)\Gamma(B,I)x_0(nom) \qquad \text{EQ 5}$$

Next define the estimate of $\alpha$, $\hat{\alpha}$ (alpha hat), as the $$\hat{\alpha} = \alpha(I)\Gamma(B,I) \quad \text{EQ 6}$$

From Equation (2) we defined the estimate of $\beta$, $\hat{\beta}$ $$\hat{\beta} = \beta(I)\Gamma(B,I) \quad \text{EQ 7}$$

Substitution on equations (6) and (7) into (5) yields $$\hat{\alpha} = y(x_0) - \hat{\beta} \, x_0(nom) \quad \text{EQ 8}$$

Now a ratio $\eta$, with $\hat{\alpha}$ from equation 6 and $\hat{\beta}$ from Equation 7, can be set up. As you see in Equation (9) below, the unknown non-linear gain constant $\Gamma(B,I)$ cancels in the ratio $\eta$.

$$\eta = \frac{\hat{\alpha}}{\hat{\beta}} = \frac{\alpha(I)\Gamma(B,I)}{\beta(I)\Gamma(B,I)} = \frac{\alpha(I)}{\beta(I)} \quad \text{EQ 9}$$

Since $\Gamma(B,I)$ cancels, the ratio $\eta$ remains fairly constant despite variations in the magnetic field B due to temperature, i.e., $\eta$ is independent of $\Gamma(B,I)$.

Substituting $\hat{\alpha}$ and $\hat{\beta}$ into Equation 1, as $\hat{\alpha}$ and $\hat{\beta}$ are defined in Equations (6) and (7) above, yields the following:

$$y(x) = \hat{\alpha} + \hat{\beta} \, x \quad \text{EQ 10}$$

From Equation (9), $$\eta \cdot \hat{\beta} = \hat{\alpha} \quad \text{EQ 11}$$

Substituting for $\hat{\alpha}$ in Equation (10) with the equality of Equation (11) yields:

$$y(x) = \eta \cdot \hat{\beta} + \hat{\beta} \, x \quad \text{EQ 12}$$

Solving Equation (12) for $\hat{\beta}$ yields the following Equation (13):

$$\hat{\beta} = \frac{y(x)}{\eta + x} \quad \text{EQ 13}$$

Equation 13 is important since it can be used to estimate $\hat{\beta}$ while the actuator is in park position after $\eta$ has been estimated and stored in nonvolatile memory. When the actuator is in the park position, the suspension is placed on the ramp, at $x_0$ (nominal), to within an error of less than plus or minus 0.005 millimeters, which is the manufacturing tolerance of the various drive components making up the actuator. The ratio $\eta$ is determined from measuring the actual value of $\Gamma(B,I) \beta(I) x$ and $\Gamma(B,I) \alpha(I)$ at two tracks on the disk. At manufacturing time, the distances $x_1$ and $x_2$ can be determined and repeated very closely using whatever servo system is on the disk. Once $\eta$ is measured, one can always estimate the slope of the curve or $\hat{\beta}$ by taking a measurement of $y(x_0$ (nominal)) while the actuator is in the park position since both $x_0$ (nominal) and $\eta$ are known. Before $\eta$ is estimated for the first time, a nominal or manufacturing value can be used initially. The estimate of $\hat{\beta}$ can then be used to find the velocity of the head as it travels down the ramp since the starting point $x_0$ nominal is known and the slope or variation of the Hall sensor output ($y_0$) with respect to distance is also known. This process is very robust to changes in temperature and allows the use of the disk drive under adverse temperature conditions.

From this, the velocity of the head going down the ramp can be derived quite simply. The Hall effect sensor voltage $y(x)$ is sampled at a frequency $$f_s = \frac{1}{T_s} \quad \text{EQ 14}$$

Considering the nth and the (n−1)th samples, then $v_n$ the sampled velocity, can be written:

$$V_n = \frac{X_n - X_{n-1}}{T_s} = \frac{Y_n - Y_{n-1}}{\hat{\beta} T_s} \quad \text{EQ 15}$$

The far right hand side of the above equation contains variables which are either known or measured by the Hall effect sensor at the sample times on either side of ($T_s$). This last portion gives the velocity and also becomes the control equation for the system to control the velocity of the head down the ramp.

Figure 8A:
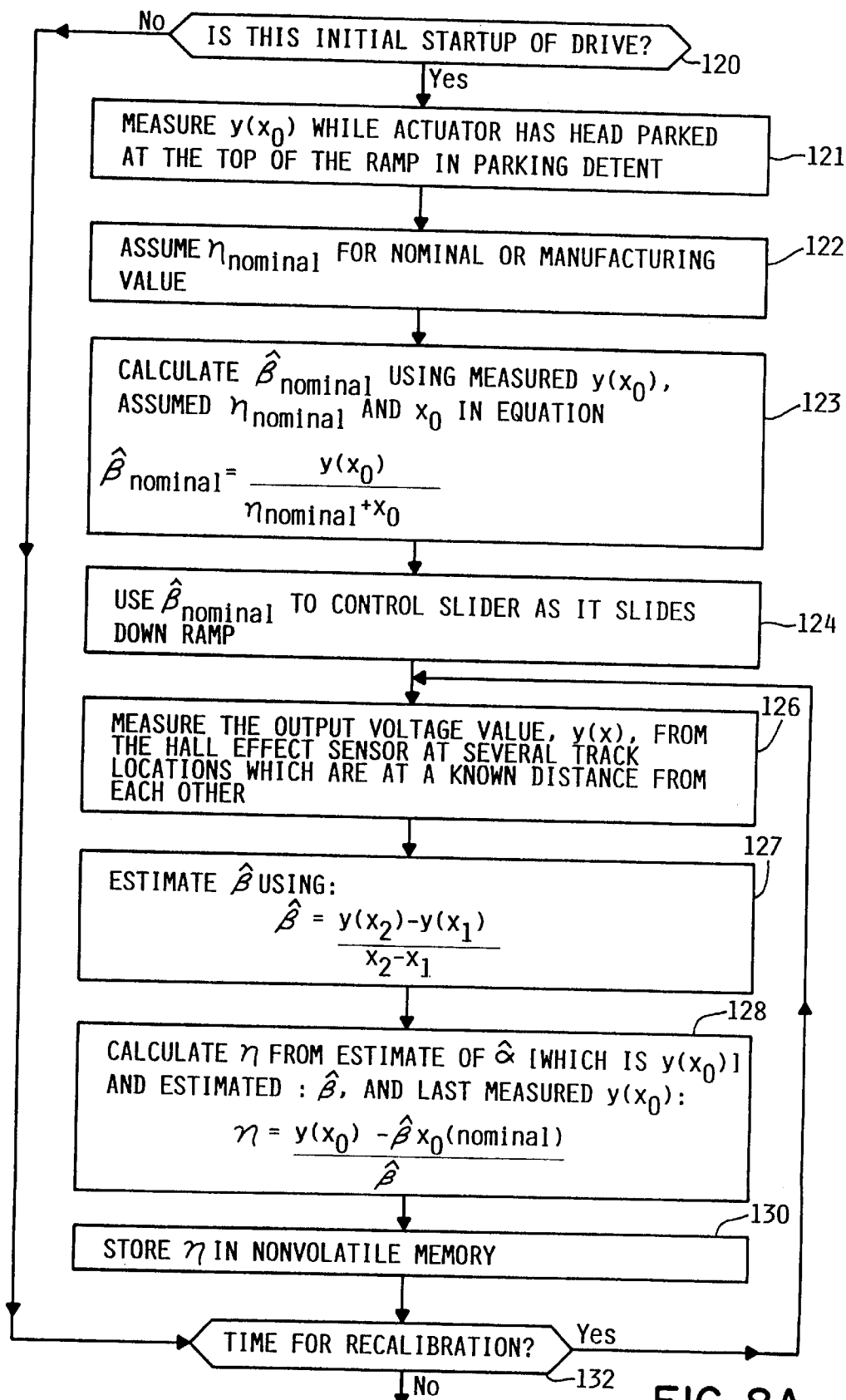
FIG. 8A is a flow diagram showing a method for initially starting the disk drive.
Figure 8B:
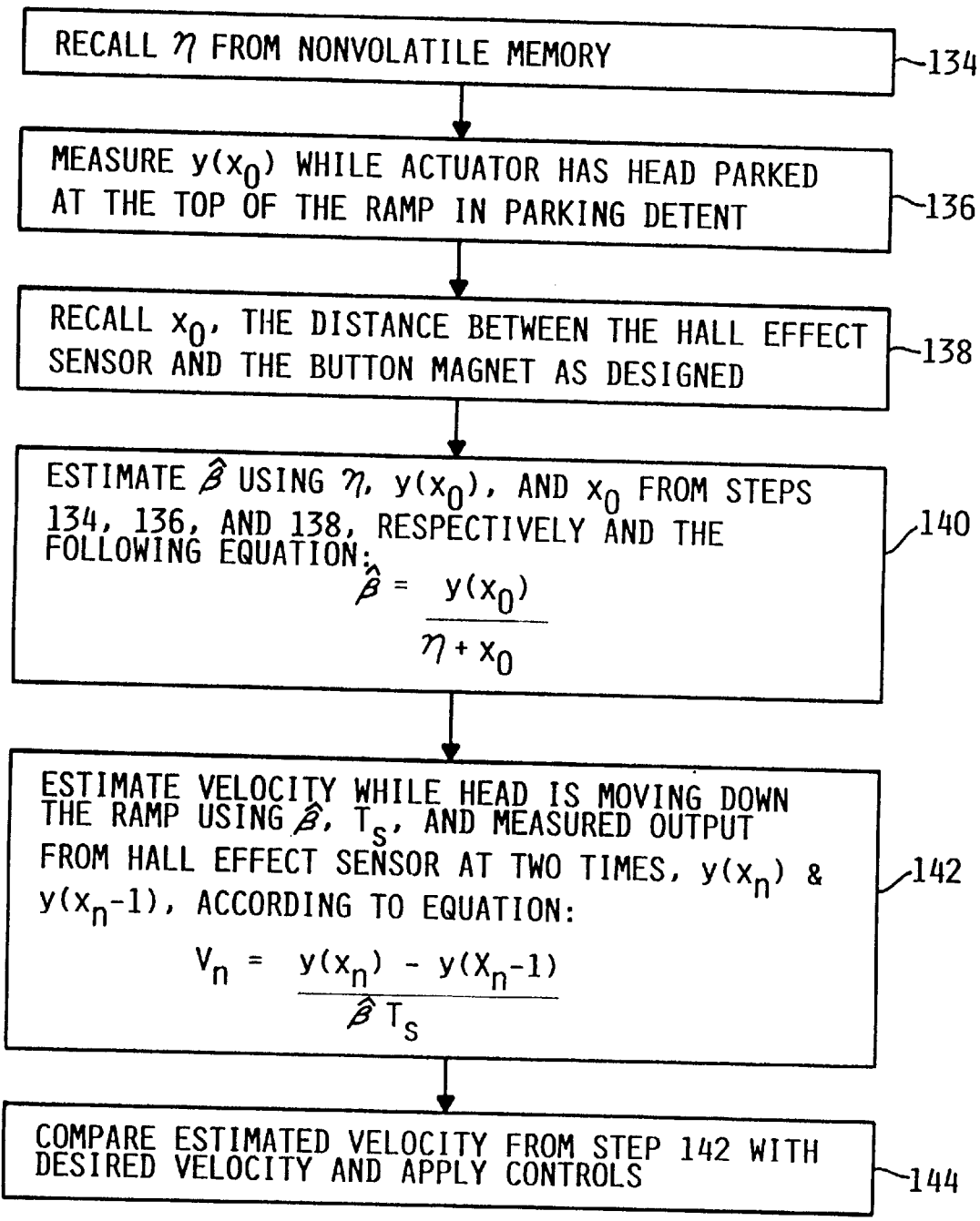
FIG. 8B is a flow diagram showing a method for starting the disk drive.

FIGS. 8A and 8B show the steps necessary for operation of the ramp control system. Now turning to FIG. 8A, the details of calibrating the ramp velocity control up for the very first time will be discussed. The first step is to determine if this is the first time a particular disk drive has ever been started. This is represented as decision box 120. It should be noted that this box represents the very first time the disk drive is ever started rather than each time the disk drive is started. In other words, decision box 120 represents a one time event when there is no data from the disk drive from previous times the drive has been run. Initially when the newly manufactured disk drive is started for the very first time, there is no data from the drive itself on which to base any estimates. In this instance, data which applies to each drive of a similar design is used to place the head on the disk. Before the actuator and head go down the ramp, the voltage output of the Hall effect sensor 82 in the magnetic field of the small button magnet 81 is measured while the actuator is in the park position at the top of the ramp, As shown in FIG. 7, $f(x_0)$ is defined, for the sake of simplicity, as the distance between the Hall effect sensor 82 and the small button magnet 81 while the actuator assembly 20 is in the park position. This can be thought of as shifting the y-axis in FIG. 6 to its its new position in FIG. 7. The result is that when $x=y_0$ you are actually measuring the y intercept which is $\hat{\alpha}$ in the equation $y(x)=\hat{\beta}x+\hat{\alpha}$ [EQ 10]. This is represented by step 121 in FIG. 8A. Next, as represented by step 122, a nominal or manufacturing value of $\eta$ is assumed. The measured value of $y(x_0)$, the assumed $\eta$ (nominal), and $x_0$(nominal) are used to estimate $\hat{\beta}$ nominal, as indicated by step 123. $X_0$(nominal) is the position on the ramp within manufacturing tolerances. Therefore, $\hat{\beta}$ nominal is an estimate calculated from one measured variable and two assumed values. The next step, 124, is to use the $\hat{\beta}$ nominal estimate to control the slider as it moves down the ramp for the first time. On subsequent trips down the ramp, $y(x_0)$ is measured for an estimate of $\hat{\alpha}$. The next step, 126, is to measure the voltage output value, $y(x)$, from the Hall effect sensor at two track locations which are at a precisely known distance from one another. This is because the physical locations of all concentric tracks in a hard disk drive are magnetically recorded on the disk surface at manufacturing time by a highly accurate external positioning system. Therefore, the distance between two arbitrary tracks is known to within a tolerance of a few microinches. The disk servo system 70, such as an embedded servo system or dedicated servo system, is used to precisely locate and follow a given track to within a few microinches. Thus the distance between two tracks are known with a high degree of accuracy. With such an accurate "yardstick," one gets a superior calibration. The disk servo system 70 is used to track follow on the desired track for several complete revolutions and the output of the Hall effect sensor is averaged for the duration of the track following time. The known positions on the disk must be averaged over an integral number of revolutions to cancel out any repeatable runout of the tracks on the disk. Once two values of $y(x)$ are found, $\hat{\beta}$ can be found using Equation 4 above. Once $\alpha$ and $\hat{\beta}$ are known, the ratio of $\eta$ can then be calculated for the system, as shown in step 128. This value is stored, step 130, and updated on occasion. Decision box 132 represents one way to determine recalibration based on an elapsed desired time, t. There are, of course, a number of different criteria that can be used as selection criteria for recalibrating the system. Recalibration of the value $\eta$ requires a repeat of Steps 126, 127, 128, and 130. In Step 130, the value of $y(x_0)$ used is the last measured value of the Hall effect sensor when the head was positioned at $x_0$ in the parking detent on the ramp.

Now turning to FIG. 8B, the operation and advantages of the invention will be discussed. After the initial calibration, the number for $\eta$ will be known and can be called from non-volatile memory as depicted by box 134. While the actuator assembly 20 is in a parked position at $x_0$, the voltage output from the Hall effect sensor 82 is measured thereby yielding $y(x_0)$ as depicted by box 136. The distance $x_0$ is also known, as shown by box 138. The next step is to use the measured $y(x_0)$, the known $x_0$, and the calculated $\eta$ to derive an initial estimate at an unknown temperature of the slope of the curve or $\hat{\beta}$ using the formula shown in box 140. Once the slope of the curve and the starting point $x_0$ is known, an accurate estimate of distance as represented by the voltage output from the Hall effect sensor can be determined. Of course, position could be used to control the movement of the actuator down the ramp; however, in the preferred embodiment velocity is estimated using the equation shown in box 142. The velocity estimate is then compared to a desired velocity and the difference, if any, is used to control the current to the coil of the voice coil motor in an attempt to make the estimated velocity match the desired velocity at the next sample time, as shown at box 144. The slope $\hat{\beta}$ can be updated while the hard disk drive is in normal operation by the application of EQ 4.

Figure 9:
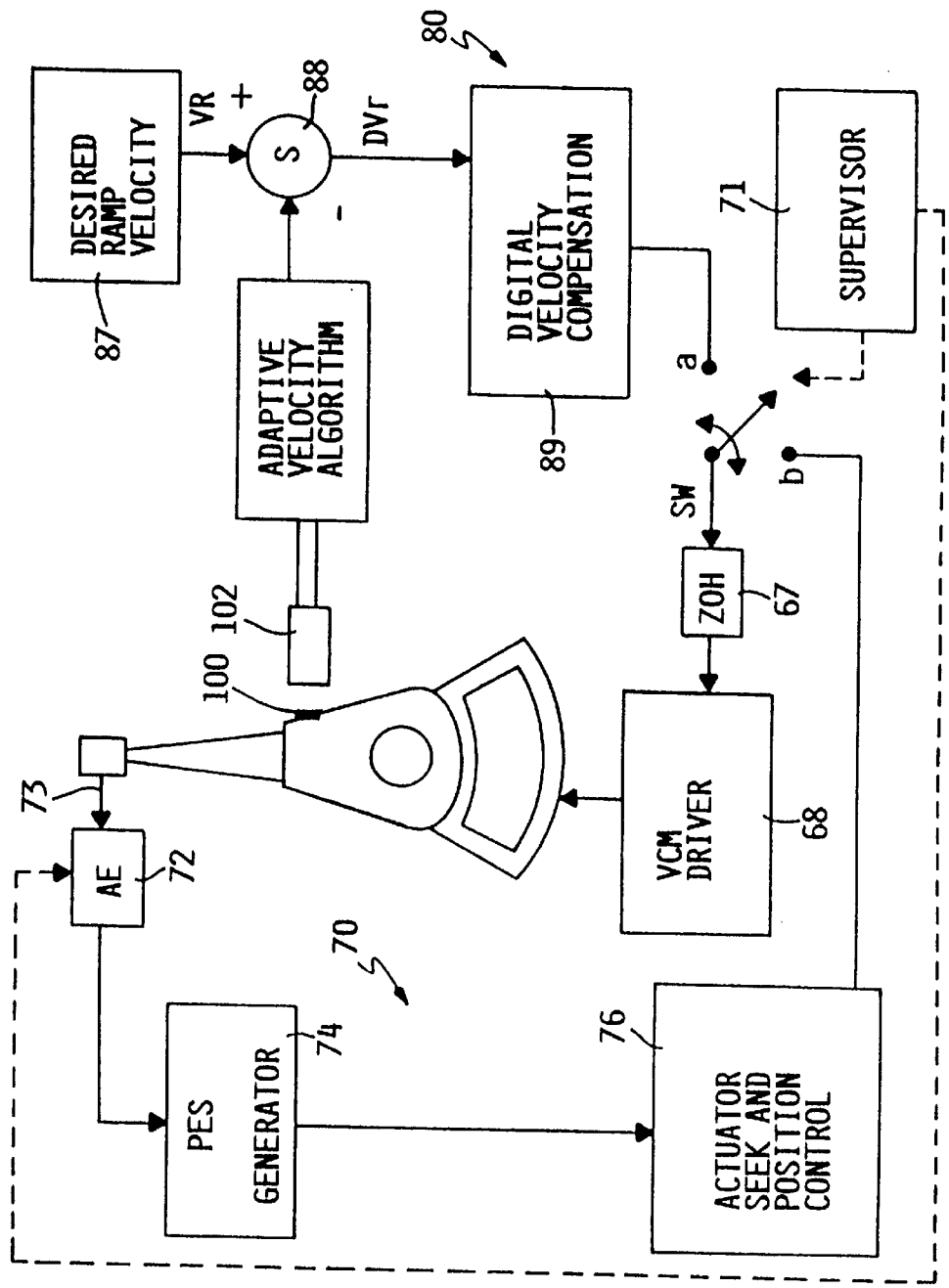
FIG. 9 is an schematic view of a second preferred embodiment of the inventive velocity controller. (optical)

FIG. 9 shows a second preferred embodiment of the invention. This preferred embodiment has many of the same elements, however, an optical white target 100 and an optical source and detector 102 have been substituted for the Hall effect sensor and the magnet. The optical target is attached to the actuator assembly 20. This preferred embodiment would work by having the distance calibrated directly by an optical source and detector 102 detecting the intensity of light from the optical target 100 attached to the actuator assembly 30. The shape of te optical target 100 can be changed to provide different intensities of light. The shape can be changed to produce various functional relationships between distance and light intensity. The optical source and detector output can be converted from positional information to velocity information as the transducer passes over the ramp portion 38. This actual, calibrated velocity information is compared to the desired velocity from the source of desired ramp velocities 87 in the summer/comparator/adder 88. The output which is the difference between the actual and desired velocity is sent to the digital velocity compensator 89 where a signal is output to control actuator so that it approaches the desired velocity at the next sample time. As before, the supervisor 71 switches between the ramp servo electronics 80 and the disk servo electronics 70. The disk servo electronics 70 work in precisely the same way as in the preferred embodiment with the Hall effect sensor discussed above.

In another embodiment, a light source and one-half of an optical grid can be attached to the housing. This would substitute for the Hall effect sensor or the detector and sensor 102. The other half of an optical grid could be attached to an actuator so that an optical grid is formed. Movement of the actuator causes movement within the grid which in turn causes the intensity of a light source to vary sinusoidally. The variations in intensity can be transformed to a signal which varies. The variations can be counted to give a direct measure of position and velocity with respect to time. With two light sources, the sources can be positioned so that the signals produced are 90° out of phase from one another. With two signals 90° out of phase from one another, the direction of the moving half of an optical grid can be determined.

It is further contemplated that in a disk drive the optical electronics could be used to servo on the disk as well as on the ramp. This would generally require a very fine grid 100.

Figure 10:
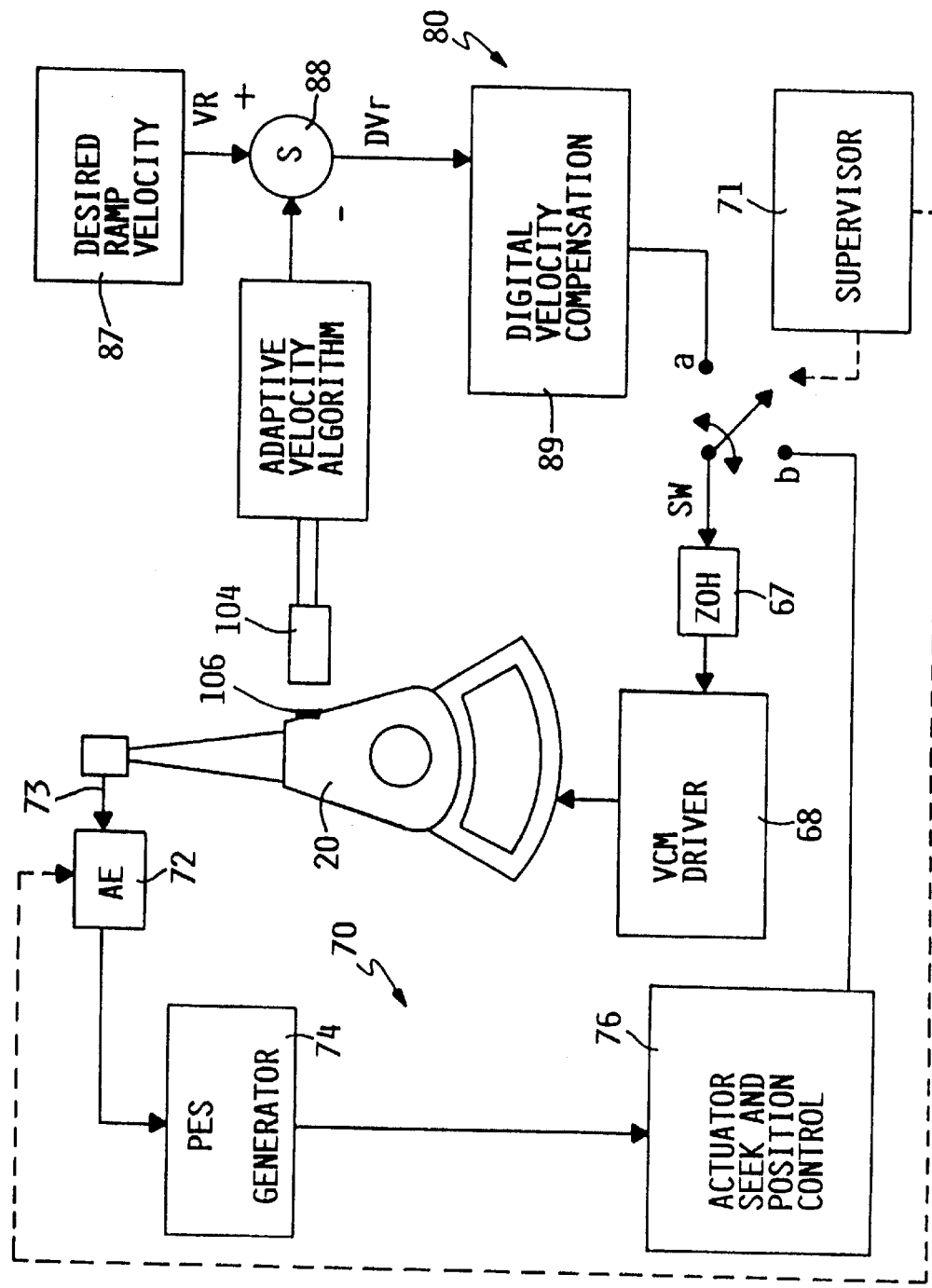
FIG. 10 is an schematic view of third preferred embodiment of the inventive velocity controller. (capacitance probe)

FIG. 10 shows still another embodiment, in which a capacitance probe has been substituted for the Hall effect sensor 82 or the grid and optical reader shown in FIG. 9. In this particular embodiment, the distance measure is made on the basis of capacitance between two plates. Like the Hall effect sensor, the measured capacitance between two plates will vary as a function of distance. The difference in the measured capacitance can be used to determine the distance between the actuator and the probe. In this embodiment, a capacitance probe 104 is attached to the housing 12. A plate 106 is attached to the actuator assembly 20. Of course, as well understood by those skilled in the art, the probe 104 and the plate 106 could very easily be switched and this embodiment would be equally effective.

The difference in capacitance would be used to determine velocity of the head as it moves down the ramp. The capacitance probe 104 output can be converted from positional information to velocity information as the transducer passes over the ramp portion 38. This actual, calibrated velocity information is compared to the desired velocity from the source of desired ramp velocities 87 in the summer/comparator/adder 88. The output which is the difference between the actual and desired velocity is sent to the digital velocity compensator 89 where a signal is output to control actuator so that it approaches the desired velocity at the next sample time. As before, the supervisor 71 switches between the ramp servo electronics 80 and the disk servo electronics 70. The disk servo electronics 70 work in precisely the same way as in the preferred embodiment with the Hall effect sensor discussed above.

With such a system there would be two sets of servo electronics much like that shown in the previous embodiment. An intelligent controller supervisor 71, which is generally a portion of a microcontroller, switches between the ramp servo system 80 and the disk servo system 70 associated with the disk. The ramp servo system 80 would operate while the head is travelling over the ramp structure and the disk servo system 70 would operate while the head is travelling over the disk 34.

Figure 14A:
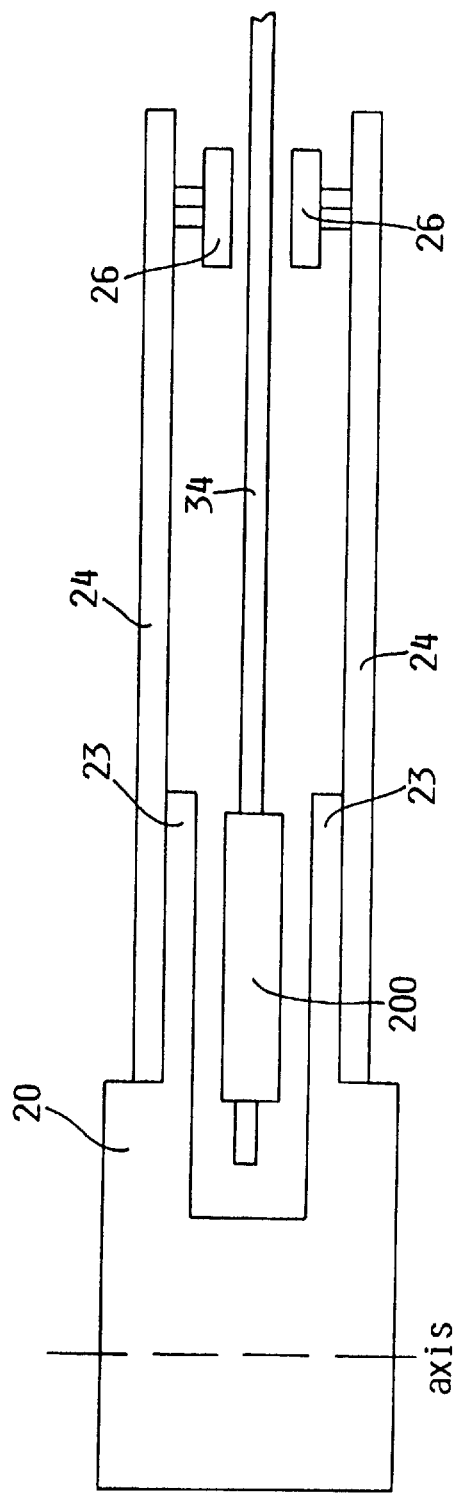
FIG. 14A is a side view of an actuator assembly having a capacitive plate positioned between the arms of the E block.
Figure 14B:
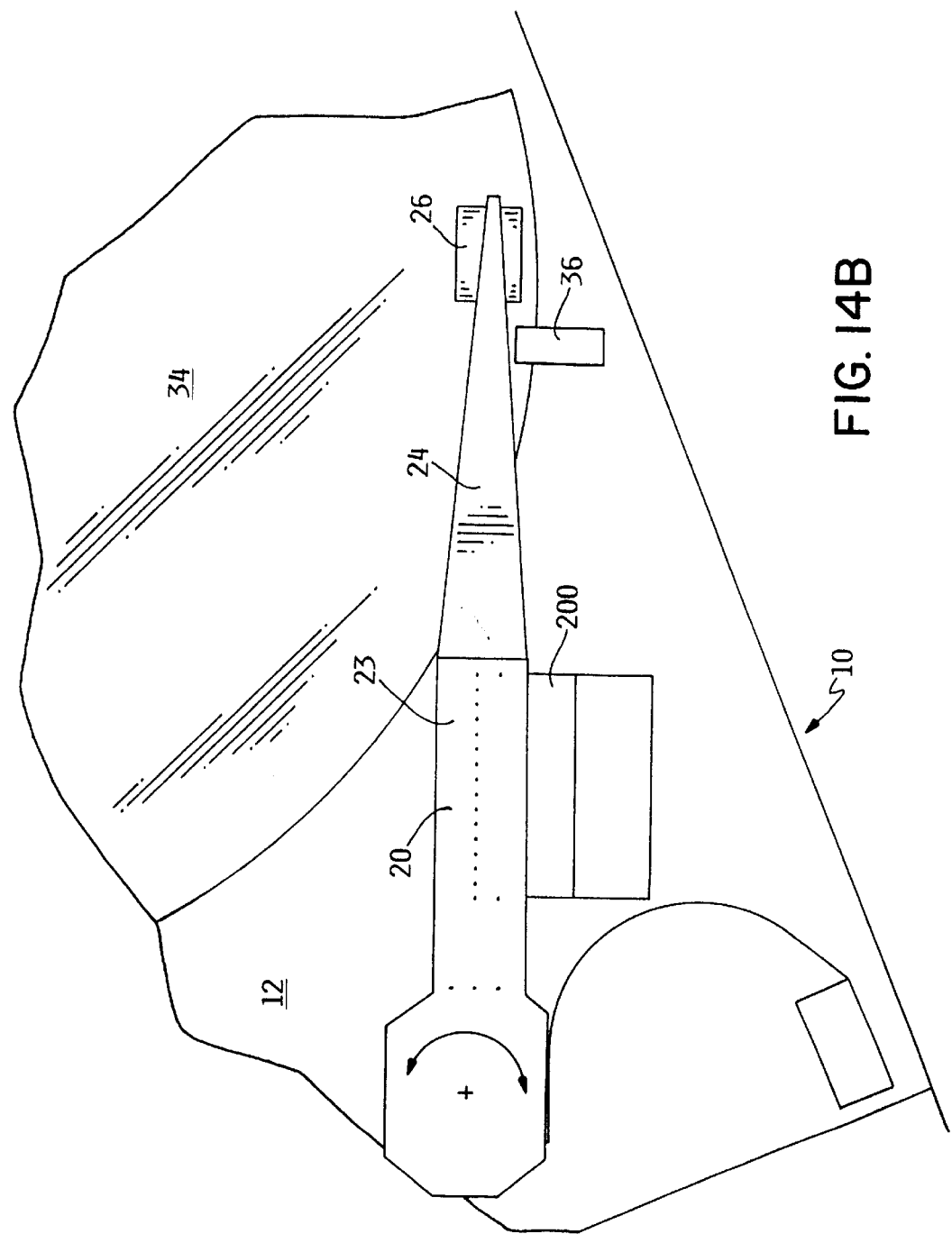
FIG. 14B is a top view of FIG. 14A and includes several other portions of a disk drive.

Now referring to FIGS. 14A, 14B and 15, a preferred arrangement for a capacitive sensor will be discussed. As shown in FIGS. 14A and 14B, a capacitive plate 200 is physically attached to the housing 12 of the disk drive 10. The capacitive plate 200 is electrically isolated from thecasting forming the housing so that a charge may be placed on the capacitive plate 200 rather than on the entire housing 12. The capacitive plate, which acts as one plate of a capacitor, is located so that it fits between the arms 23 of the actuator assembly 20 with a desired amount of clearance. The arms 23 typically are flat plates between the axis of rotation and the area where a suspension is attached to the arm. The arms 23 of the actuator assembly 20 are grounded via a line in the flex cable (not shown). Therefore, the arms 23 act as grounded plate of a capacitor. As the actuator assembly 23 rotates to move the transducer down the ramp 36 (not shown), the area of the arm 23 in close proximity to the capacitive plate 200 varies which in turn varies the capacitance.

Figure 15:
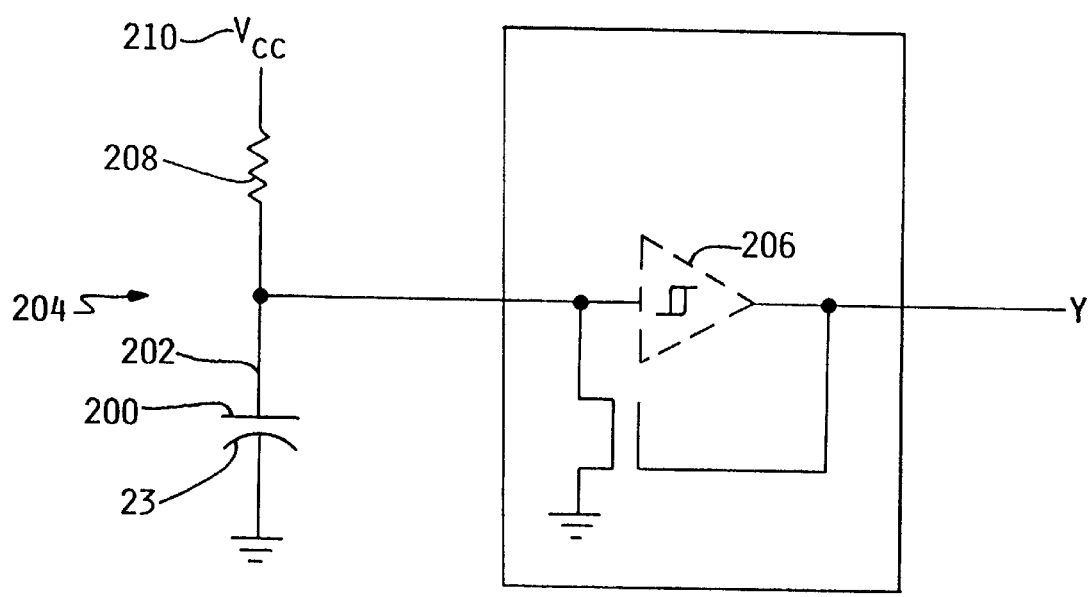
FIG. 15 is a schematic diagram associated with the capacitive sensor shown in FIGS. 14A and 14B.

Now looking to FIG. 15, a wire 202 is attached between the capacitive plate 200 which is part of a circuit 204, shown in FIG. 15. The circuit 204 is actually an RC circuit which acts as a variable oscillator. The circuit 204 includes the variable capacitor comprised of the capacitive plate 200 and the arms 23 of the actuator assembly 20, a Schmidt trigger 206, and a resistor 208 attached to a voltage supply 210. Of course, some of the components of the circuit 204, with the exception of the capacitive plate 200 and the arms 23, can be formed into a chip or made with discrete components. One example of such a chip is available from Texas Instruments as part number SN74ASC2502. The capacitive plate 200 and the arms 23 of the actuator assembly 20 are the capacitor in the circuit. The capacitor formed is variable since the area of the capacitive plate 200 in close proximity to the arms varies. As is well known in the art, the capacitance between two plates varies with the area in close proximity. The capacitance between the plates of a capacitor is also inversely proportional to the distance between the plates of the capacitor. Therefore, the clearance between the arms 23 and the capacitive plate 200 is selected to yield a desired capacitance.

The operation of the capacitive sensor will now be discussed with the aid of FIG. 15 and one more basic, well known principle. The principle is that an RC circuit has a time constant which means, in simple terms, that a capacitor can carry a certain level of charge and that the time it will take to build up to this level of charge from a resistor connected to a voltage source will vary dependent on the amount of resistance and the amount of capacitance in the RC circuit. The resistor 208, in the RC circuit formed, is held constant. The capacitor, formed by the capacitive plate 200 and the arms 23 of the actuator assembly 20, vanes as the actuator assembly 20 rotates. Since the capacitance varies, the time constant of the circuit will also vary. The total capacitance of the RC circuit formed includes the variable capacitance between the plate 200 and arms 23, described above; the stray capacitance between the plate 200 and the housing casting; the lead capacitance to ground; and the circuit input capacitance In operation, a variable frequency oscillator is formed by the circuit 204. The frequency at which the circuit oscillates is dependent on the position of the actuator assembly 20 with respect to the capacitive plate 200 because the position of the arms 23 with respect to the plate 200 varies the capacitance in the circuit 204. The Schmidt trigger 206 shorts the capacitance to ground when the voltage at the Schmidt trigger 206 in the circuit 204 reaches a certain level. After the capacitance is shorted to ground, the capacitor begins to recharge up to the certain level where the Schmidt trigger again shorts the capacitance to ground. This process repeats over and over. The time necessary for the voltage at the Schmidt trigger to reach the level where the Schmidt trigger 206 shorts the capacitance to ground varies with the capacitance or the position of the actuator arms 23 with respect to the plate 200. Thus, the frequency of the oscillator circuit formed varies as a function of the position of the arms 23 with respect to the plate 200 and can be used to locate the position of the transducer 50 with respect to the ramp structure 36.

In practice, the frequency change between the position of the actuator assembly 20 where the transducer 50 is in the parking detent 46 and the end of the ramp structure is the important measure. Although the capacitance will change as a function of temperature, the variation in the frequency range through which the RC circuit passes as the actuator assembly 20 moves the transducer over the ramp 36 does not alter drastically. Therefore, when initially starting the disk drive with the transducer 50 in the parking detent 46, the frequency is measured. The frequency at the end of the ramp 36 is also measured. The difference in the frequencies, or the range of the frequency, is stored in nonvolatile memory. When the transducer 50 is to be moved down the ramp 36 after initial starting the disk drive, the frequency while in the park position is recorded and the range figure is added to the initial frequency. From this, one can always determine the position of the transducer 50 with respect to the ramp 36. The positional information obtained can then be used to determine the velocity over a sample time and this can be compare to a desired velocity and correction can take place in a closed loop process. Advantageously, the frequency change down the ramp will be in roughly a one to one correspondence to the position of the transducer 50 with respect to the ramp 36. Once the transducer 50 has passed over the ramp and onto the disk, the RC circuit 204 may be disabled to prevent any interference with the read and write operations in the disk storage device.

Figure 11:
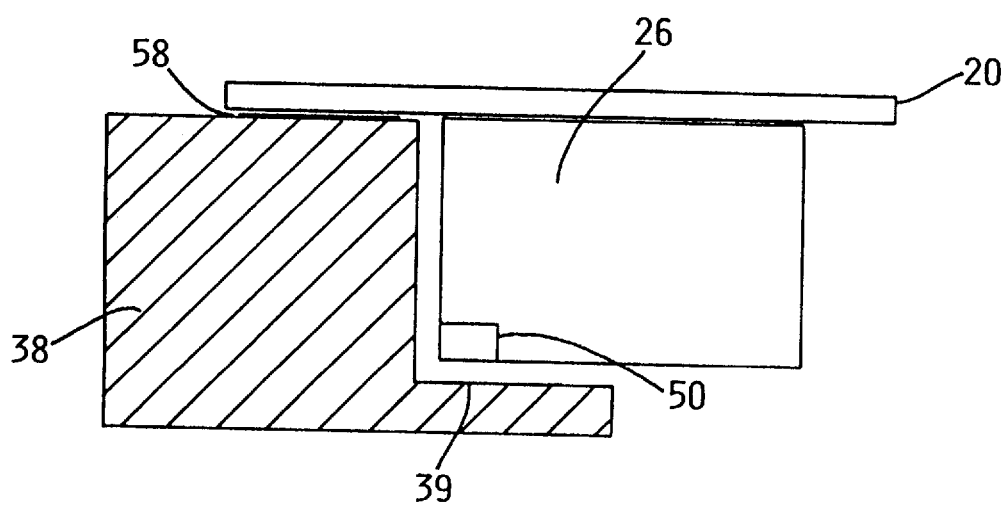
FIG. 11 is an schematic view of fourth preferred embodiment of the inventive velocity controller. (magnetic strip)

FIG. 11 shows yet another preferred embodiment. In this embodiment, a transducer 50 in the slider 26 is used as the sensor for determining position on the ramp as well as used as the sensor for determining the position on the disk. In this embodiment, the ramp portion 38 includes an additional ledge 39 which is designed to be near the transducer 50 in the slider 26 while the actuator assembly 20 is moving the slider 26 over the ramp portion 38. The ledge 39 could be designed to be part of the ramp support structure 40. The ledge 39 includes a portion which can be magnetized. In FIG. 11 this is shown as a layer on the surface 39' near the transducer 50. The surface 39' of the ledge 39 is magnetized with a servo pattern readable by the transducer 50. The surface 39' could be an applied magnetic strip, a magnetic layer directly sputtered on the ledge 39, a layer of material containing iron oxide particles, or any other known layer of magnetizable material. It should be pointed out that the entire ramp structure 36 (shown in FIG. 2) or certain portions in addition to the ledge 39 could also be covered with a magnetizable surface.

Figure 12:
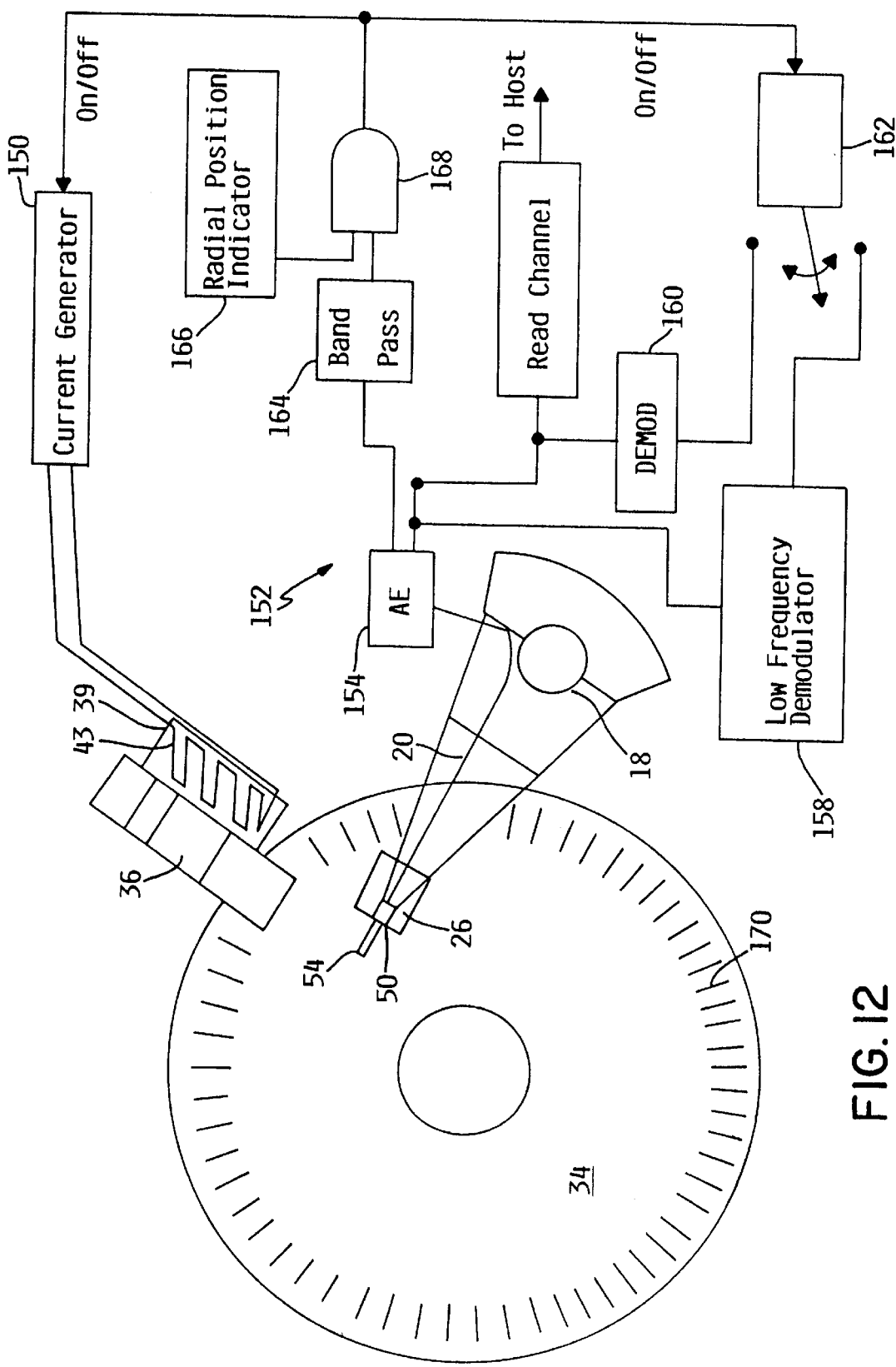
FIG. 12 is a flow diagram showing an embodiment with a current carrying wire on a ledge of the ramp and a related electronic circuit for such a system.

FIG. 12 shows a variation of the embodiment of the invention shown in FIG. 11. In this variation, the ledge 39 is provided with a current carrying wire 43. The wire 43 in the preferred embodiment is part of a flexible circuit 172 which has a shape corresponding to the ledge 39 of the ramp portion 38. The flexible circuit 172 is attached to the surface of the ledge 39. The wire 43 could also be embedded into the ledge 39. It should be noted that the wire 43 preferably is at an angle with respect to the edge of the ledge 39 and to the path of travel of the transducer 50. The angle shown is approximately 45 degrees with respect to the path of travel of the transducer 50 (shown in greater detail in FIG. 13). At this angle a magnetic field around the wire includes a component which is in the same direction as the transitions on the disk 34 (shown in FIG. 1). Of course, this angle is not absolutely necessary and the angle could be varied to accomplish the same purpose as described above. It should also be noted that in the case of vertical magnetic recording the component of the magnetic field of the wire 43 of interest would be normal to the plane of the disk 34 and the angle of the wire 43 with respect to the path of travel of the transducer 50 would not be critical The current carrying wire is attached to a current generator 150. The current generator is switched on when the actuator assembly 20 (shown in FIG. 1) moves the transducer 50 over the ledge 39. The current generator is switched off when the transducer 50 is in transducing relationship with the disk 34. Switching the current generator 150 off prevents noise or interference with the transducer 50 while it is positioned to read data and also reduces the total overall power consumption of the drive.

FIG. 12 also includes the electronic circuit 152 for reading the magnetic transitions produced by the current carrying wire 43 and the magnetic transitions on the disk 34. The electronic circuit includes an arm electronics module 154 and a read channel 156. Both of these circuits are well known in the art and therefore will be described very generally. The arm electronics module amplifies and cleans up the signal read from the disk. The read channel either decodes the read signal and ships data from the disk to a computer system or encodes the data from a computer system and places on the disk. The electronic circuit 152 also includes a low frequency demodulator 158 and a regular or higher frequency demodulator 160. A switch 162 switches between the low frequency demodulator 158 and the higher frequency demodulator 160. The circuit also includes a band pass filter 164 and a radial position indicator 166 and an AND GATE 168. The electronic circuit 152 is attached to a transducer 50 which reads a disk 34 also shown in FIG. 12. The disk 34 includes a ramp structure 36 positioned at the outer periphery of the disk 34. The disk 34 includes an area 170 in the outer track or tracks of the magnetized portion of the disk 34 that includes transitions that occur at a constant frequency. The area of the disk that is written at constant frequency is near the outer periphery of the disk which is also near the ramp structure 36.

In operation, the electronic circuit 152 for reading magnetic transitions operates as described in this paragraph. The arm electronics module 154 and the read channel 156 operate in a conventional manner. When the transducer 50 passes over the constant frequency portion 170 of the disk, the signal produced is of constant frequency. The output from the arm electronics module 154 is also a constant frequency signal. The constant frequency signal from the arm electronics module 154 is input to the bandpass filter 164 which produces an output when the frequency of the signal input matches the frequency of a signal produced from reading the constant frequency pattern 170 on the disk 34. A radial position detector 166 outputs a signal when the actuator arm (not shown) has the transducer 50 positioned over the outer tracks of the disk. When there is an output from both the band pass filter 164 and the radial position detector 166 the AND GATE produces an output signal. The radial position detector 166 assures that the output from the AND GATE does not occur if by chance a constant frequency signal is produced while the transducer 50 is positioned over another area other than the constant frequency portion 170 of the disk 34.

The output of the AND GATE 168 controls the current generator 150 and the switch 162 between the low frequency demodulator 158 and the higher frequency demodulator 160. The AND GATE output can be thought of as a trigger signal for switching between reading the transitions produced by the current carrying wire 43 positioned on the ledge 39 of the ramp and the transitions on the disk 34. Basically the output of the AND GATE 168 causes the current generator 150 to turn on or off and causes the switch 162 to switch between the low frequency demodulator 158 and the higher frequency demodulator 160. When the transducer is over the disk and reading or writing data to or from the disk, the power to the current carrying wire is in the off position and the switch 162 is in a position where the higher frequency demodulator 160 is being used to demodulate the data. When the transducer is traveling over the ledge 39 of the ramp, the current generator 150 is on so that current is produced in the current carrying wire 43 and the switch is in a position so that the low frequency demodulator 158 is being used to read the transitions produced by the wire 43.

When the transducer 50 passes over the constant frequency area 170 of the disk 34, it triggers the switching in the electronic circuit 152. For example, while reading data, the signal produced by the transducer 50 is demodulated with the high frequency demodulator 160 and the current generator 150 is off. The actuator moves the transducer toward the ramp structure 36 and passes into the constant frequency region 170 of the disk. The constant frequency region 170 causes a constant frequency signal and an output from the band pass filter 164 which is input to the AND GATE 168. The radial position indicator 166 outputs a signal when the actuator has the transducer positioned near the outer periphery of the disk which corresponds to the constant frequency portion 170 of the disk 34. The output of the radial position indicator 166 is input to the AND GATE as well. In response to inputs from the radial position indicator 166 and the band pass filter 164, the AND GATE 168 outputs a signal to the current generator 150 and the switch 162. In response to the AND GATE signal, the current generator turns on and the switch moves from a position where the signal from the transducer is passed through the high frequency demodulator 160 to a position where the signal from the transducer is passed through the lower frequency demodulator 158. Therefore, as the transducer 50 goes up the ramp toward a park position, there is current in the wire 43 and the lower frequency demodulator 158 is being used to read the transitions produced.

When in the park position, the current generator 150 is on and producing current in the wire 43. The switch 162 is positioned so that the lower frequency demodulator 158 is ready to read transitions. As the transducer is moved down the ramp and over the ledge 39, the low frequency demodulator 158 demodulates the signal. The transitions counted in the demodulated signal give a direct indication of the position of the transducer with respect to the ledge 39 and the ramp. This positional information can be used to calculate the velocity of the transducer 50 as it travels down the ramp. The calculated velocity can be compared to a desired velocity for a particular position and the difference can be used as feedback to control the current to the voice coil of the voice coil motor of the actuator to produce the desired velocity at the next position down the ramp. After the transducer 50 travels down the ramp, it passes over the constant frequency area 170 of the disk 34. The constant frequency area causes a signal with a constant frequency which is input to the band pass filter 164. The band pass filter 164 outputs a signal which is input to the AND GATE 168. At the same time the radial position indicator 166 indicates that the transducer 50 is positioned over the constant frequency area 170 at the outer periphery of the disk 34 and inputs a signal to the AND GATE 168. As a result, the AND GATE 168 outputs a signal which is input to both the current generator 150 and the switch 162. The current generator 150 is turned off upon receiving the signal from the AND GATE 168 and the switch 162 is positioned to the higher frequency demodulator 158 to allow demodulation of the data when read. Thus, as can be seen, the constant frequency area of the disk 170 produces a constant frequency signal which produces an output from the band pass filter 164. The radial position indicator assures that the transducer 50 is reading on the constant frequency area and causes the AND GATE 168 to produce a trigger signal that switches the current generator on or off and switches to the other of two demodulators. The state of the current generator 150 and the switch 162 depends if data is going read from the disk or if transitions are going to be read from the current carrying wire 43.

It should be noted that the current generator 150 doesn't have to be a separate device but could be a portion of the power supplied to the disk drive. It should also be noted that when the system has been powered down, the disk drive will position the slider 26 and the transducer 50 within it in a park position in the parking detent 46 atop the ramp structure 36. Therefore, when power is first supplied to the disk drive, the current generator 150 should be turned on and the switch 162 should be positioned to use the low frequency demodulator 158.

This alternative embodiment has the advantage of not requiring a magnetized surface 39' or requiring the writing of a servo pattern onto the surface 39'. In addition, particle generation, if any, will be minimized since no particles will be generated from the magnetizable surface 39' being scraped off. In addition, the current to the current carrying wire 43 can be shut off while the actuator assembly 20 has the slider 26 and transducer 50 positioned over the disk. This minimizes the possibility of having stray magnetic fields which might be detrimental to the data stored on the disk. Of course, the current level in the wire 43 would be designed to be low enough so that the magnetic field produced by the current would not effect the magnetic field on a disk if the data was stored on the disk magnetically. Turning off the current in wire 43 would thus be an optional form of insurance.

As shown in FIG. 12, the wire 43 in this alternate solution would be positioned so that the wire would cross the line of travel of the transducer as the actuator assembly 20 moves the slider 26 which carries the transducer 50 over the ramp portion 38 of the ramp support structure 40. Advantageously, the crossing pattern would produce magnetic fields which are opposite each other so that the opposite fields could be counted while the actuator moves the transducer down the ramp.

The current in wire 43 may be an alternating current of moderate frequency. This produces a significantly higher frequency than that produced by the lead passing over the wire sections with the opposite current direction. When an alternating current is used that is significantly higher frequency than the wire crossing frequency, the higher frequency is amplitude modulated. If the amplitude is rectified and filtered, a high amplitude will be found when crossing each wire and zero voltage will occur between each wire. The higher frequency is significant for systems containing coupling capacitors that were not intended to pass very low frequencies, and also for inductive read heads that generate very low voltages at the very low frequencies of the wire crossing rate that is generated when direct current is used.

The wire 43 would not provide the same amount of positional accuracy as a servo pattern on a disk. Such accuracy is not needed to get a measure of velocity over the ramp portion 38. As a result, a servo pattern, if written to a surface 39' of magnetic material could also be less precise when compared to the servo pattern on the disk surface. The servo pattern on the ramp would be different from the servo pattern on the disk to provide for a way to easily differentiate between the two servo patterns.

Figure 13:
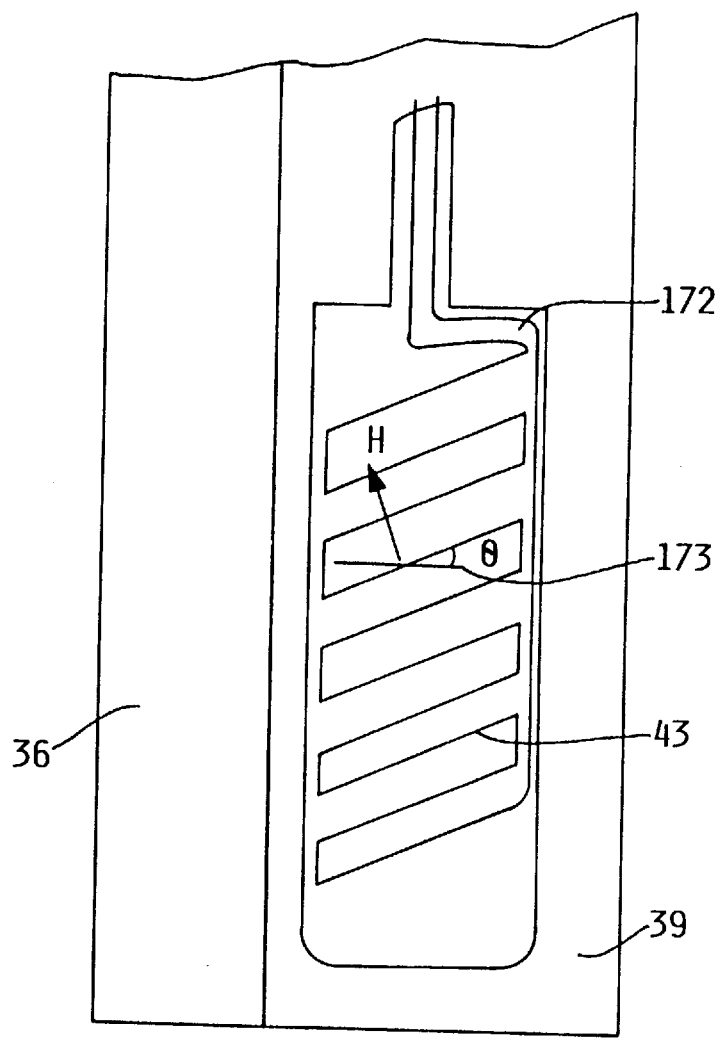
FIG. 13 is a top view of a portion of flex cable used in FIG. 12 that would be placed on the ledge of the ramp.

Now turning to FIG. 13, a top view of a portion of a flexible circuit 172 which fits on the ledge 39 of the ramp is shown. The current carrying wire 43 is within the flexible circuit 172. The current carrying wire is formed as a continuous path and crosses at an angle with respect to the edge of the flexible cable 172 as is mentioned above. In FIG. 13, the magnetic field produced by the current carrying wire 43 is shown as a vector H. A transducer 50 reads fields along a line perpendicular to the centerline of the ledge 39 or the edge of the ledge 39. A representative line 173 alone which the transducer 50 is most likely to read transitions has been added to FIG. 13. The line 173 makes an angle theta with respect to the current carrying wire 43. Thus, the component of the magnetic field that will be read by the transducer 50 is equal to:

$$H\cos(\pi/2-\theta)$$

which can be rewritten in expanded form as:

$$H[\cos \pi/2 \cos \theta + \sin \pi/2 \sin \theta]$$

since $\sin \pi/2 = 1$ and since the $\cos \pi/2 = 0$ then the expression can be stated as:

$$H \sin \theta$$

Thus it can be seen that by increasing the angle theta that the current carrying wires 43 make with respect to line 173, that the readable component of the vector H will become larger.

It should be noted that many other types of sensors could be used to perform this invention such as lasers.

The present invention and the best modes for practicing it have been described. It is to be understood that the foregoing descriptions are illustrative only and that other means and techniques can be employed without departing from the full scope of the invention as described in the appended claims.

What we claim is:

1. A disk drive comprising:
    a housing;
    at least one disk rotatably attached to said housing;
    an actuator assembly including:
        an actuator;
        a transducer attached to said actuator, said transducer positionable to a transducing relationship with said disk; and
        means for moving said actuator to move said transducer from one position with respect to a disk to another position with respect to said disk;
    a ramp attached to said housing and oriented so that a portion of the actuator passes over the ramp to load or unload the transducer; and
    a sensor means associated with said actuator for directly sewing a plurality of positions of said transducer as the actuator passes over the ramp without monitoring voltages in said means for moving said actuator.

2. The disk drive of claim 1 wherein said sensor means associated with said actuator includes a Hall effect sensor.

3. The disk drive of claim 1 wherein said sensor means associated with said actuator includes an optical sensor.

4. The disk drive of claim 1 wherein said sensor means associated with said actuator includes;
    a capacitance probe attached to one of said housing and said actuator; and a plate located on the other of said housing and said actuator so the capacitance between said capacitance probe and said plate varies as a function of the distance between said capacitance probe and said plate as said actuator passes over said ramp.

5. The disk drive of claim 1 wherein said sensor means associated with said actuator includes the transducer while the actuator is positioned on said ramp.

6. The disk drive of claim 1 further comprising a servo system which includes;

a first servo means for positioning the transducer with respect to said disk; and a second servo means for positioning the transducer with respect to said ramp.

7. The disk drive of claim 6 further comprising a controller for switching between said first servo means and said second servo means.

8. The disk drive of claim 1 wherein the sensor associated with said actuator includes a variable capacitance capacitor of a resistor-capacitor (RC) circuit, said variable capacitance capacitor being arranged so the capacitance thereof varies as said actuator passes over said ramp.

9. The disk drive of claim 1 wherein the sensor means associated with said actuator includes a current source and a variable capacitance capacitor arranged so the capacitance thereof varies as said actuator passes over said ramp.

10. A disk drive comprising:

a housing;

at least one disk rotatably attached to said housing;

an actuator including:

a transducer attached to said actuator, said transducer positionable to a transducing relationship with said disk; and means for moving said actuator to move said transducer from one position with respect to a disk to another position with respect to said disk;

a ramp attached to said housing and oriented so that a portion of the actuator passes over the ramp to load or unload the transducer; and a sensor associated with said actuator for sensing the position of said transducer as the actuator passes over the ramp, wherein the sensor associated with said actuator includes part of a resistor-capacitor (RC) circuit, and wherein the actuator further includes at least one arm and wherein the housing includes a capacitive plate attached to said housing, said at least one arm and said capacitive plate forming a variable capacitance capacitor in said RC circuit.

* * * * *

UNITED STATES PATENT AND TRADEMARK OFFICE
CERTIFICATE OF CORRECTION

PATENT NO. : 5,831,786
DATED : November 3, 1998
INVENTOR(S) : Zine-Eddine Boutaghou, Earl Albert Cunningham and Hal Hjalmar Ottesen It is certified that error appears in the above-identified patent and that said Letters Patent is hereby corrected as shown below:

Claim 1, Col. 20, Line 56, "sewing" should be --sensing--.

Claim 8, Col. 21, Line 18, "sensor associated" should be --sensor means associated--.

Signed and Sealed this

Sixteenth Day of March, 1999

Attest:

Attesting Officer

Q. TODD DICKINSON

Acting Commissioner of Patents and Trademarks